US012028366B2

(12) United States Patent
Rabin et al.

(10) Patent No.: US 12,028,366 B2
(45) Date of Patent: Jul. 2, 2024

(54) DYNAMICALLY GENERATING MULTI-FACTOR ENTITY RISK ASSESSMENTS WITHIN VIRTUALIZED ENVIRONMENTS

(71) Applicant: CyberArk Software Ltd., Petach-Tikva (IL)

(72) Inventors: Niv Rabin, Petach-Tikva (IL); Michael Balber, Beerot Itshak (IL); Noa Moyal, Hod Hasharon (IL); Asaf Hecht, Tel Aviv (IL); Gal Naor, Kefar Sava (IL)

(73) Assignee: CyberArk Software Ltd., Petach-Tikva (IL)

( * ) Notice: Subject to any disclaimer, the term of this patent is extended or adjusted under 35 U.S.C. 154(b) by 473 days.

(21) Appl. No.: 17/199,069

(22) Filed: Mar. 11, 2021

(65) Prior Publication Data

US 2021/0203687 A1     Jul. 1, 2021

Related U.S. Application Data

(63) Continuation-in-part of application No. 16/719,464, filed on Dec. 18, 2019, now Pat. No. 11,323,470.

(51) Int. Cl.
*H04L 9/40* (2022.01)

(52) U.S. Cl.
CPC ........ *H04L 63/1433* (2013.01); *H04L 63/105* (2013.01); *H04L 63/1416* (2013.01); *H04L 63/20* (2013.01)

(58) Field of Classification Search
CPC ............... H04L 63/1433; H04L 63/105; H04L 63/1416; H04L 63/20
See application file for complete search history.

(56) References Cited

U.S. PATENT DOCUMENTS 8,554,912 B1   10/2013  Reeves
8,584,219 B1 * 11/2013  Toole .................... H04L 69/24
                                                 726/25
(Continued)

OTHER PUBLICATIONS

Hecht, Asaf, CyberArk Impact 2020; "The Cloud Shadow Admin Threat: 10 Permissions to Protect", pp. 1-19, https://www.cyberarkcom/threat-research-blog/cloud-shadow-admin-threat-10-permissions-protect/.

*Primary Examiner* — Maung T Lwin
*Assistant Examiner* — Suman Debnath
(74) *Attorney, Agent, or Firm* — Finnegan, Henderson, Farabow, Garrett & Dunner LLP

(57) ABSTRACT

Disclosed embodiments relate to systems and methods for dynamically performing entity-specific security assessments for entities of virtualized network environments. Techniques include identifying an entity associated with a virtualized network environment, identifying a plurality of security factors, determining entity-specific weights to the plurality of security factors, and generating a composite exposure assessment for the entity. Further techniques include selecting at least two security factors of the plurality of security factors, identifying the weights corresponding to the selected security factors, and calculating the composite exposure assessment using the selected security factors and corresponding weights, analyzing the composite exposure assessment, and generating at least one of: a security recommendation based on the analysis to alter a scope of privileges of the entity, a notification providing an indication of the composite exposure assessment, or a visual representation of the composite exposure assessment of the entity.

21 Claims, 10 Drawing Sheets

(56) References Cited

U.S. PATENT DOCUMENTS

| | | | |
|---|---|---|---|
| 10,643,002 B1 | 5/2020 | Veselov | |
| 2013/0159049 A1 | 6/2013 | Arumugam | |
| 2013/0347095 A1* | 12/2013 | Barjatiya | H04L 63/065 |
| | | | 726/13 |
| 2014/0096177 A1* | 4/2014 | Smith | H04L 63/08 |
| | | | 726/1 |
| 2014/0189865 A1 | 7/2014 | Abuelsaad | |
| 2015/0220929 A1 | 8/2015 | Monk | |
| 2016/0110528 A1* | 4/2016 | Gupta | G06F 21/577 |
| | | | 726/19 |
| 2016/0156655 A1* | 6/2016 | Lotem | H04L 63/1416 |
| | | | 726/23 |
| 2017/0244740 A1* | 8/2017 | Mahabir | H04L 63/1433 |
| 2019/0089725 A1 | 3/2019 | Anachi | |
| 2019/0327271 A1 | 10/2019 | Saxena | |
| 2021/0336982 A1* | 10/2021 | Akella | G06F 16/22 |
| 2022/0191207 A1* | 6/2022 | Rubin | G06F 21/604 |

\* cited by examiner

DYNAMICALLY GENERATING MULTI-FACTOR ENTITY RISK ASSESSMENTS WITHIN VIRTUALIZED ENVIRONMENTS

CROSS-REFERENCE TO RELATED APPLICATIONS

This application is a continuation-in-part of U.S. application Ser. No. 16/719,464, filed on Dec. 18, 2019, currently pending, the disclosure of which is expressly incorporated herein by reference in its entirety.

BACKGROUND

Today's computing systems and networks use a wide variety of permissions to grant users access to restricted resources. While they are an important part of many modern computing environments, permissions that are not properly managed can present significant security risks. Each additional privilege (or privilege level, or duration of privileges) presents another channel through which an attacker may gain unauthorized access to target a system, computer, application, or other resource. Ideally, a system would provide only those permissions that are necessary for it to function properly, and no more, because unused permissions unnecessarily increase the risk and severity of attacks.

The high number and large variety of types of permissions pose a unique challenge to addressing these risks. Not all unused permissions present the same level of risk for attacks. For example, some permissions may give users a greater scope of access, or access to more sensitive resources, thus increasing the potential damage that could be achieved by a malicious attacker. These problems are compounded in modern virtualized (e.g., cloud-based) computing environments. In such environments, a variety of different types of applications may be utilized, each having its own rules or policies for using privileges. Similar problems exist in modern on-premises networks, IoT networks, and other types of complex networks.

Accordingly, solutions are needed to identify unused permissions and assess their damage potential so that unused permissions may be addressed in an efficient and effective manner. It would be advantageous for such solutions to assess the damage potential using a normalized score to permit meaningful comparisons between different types of permissions. Solutions should also permit such scores to be calculated for individual permissions, groups of permissions associated with an entity, or groups of entities present within a specific environment. Score comparisons should enable the system to prioritize between permissions, entities, or environments and to identify the highest risk factors so they may be addressed on a prioritized basis.

Additionally, certain factors may influence the potential attack risk that an entity poses to an environment more than other factors. Solutions should permit dynamic generation of entity assessments using factors relevant to the specific entity, while leaving out irrelevant factors. Such solutions may permit more accurate and useful entity assessments, which may facilitate more efficient security management of entities within an environment.

SUMMARY

The disclosed embodiments describe non-transitory computer readable media, systems, and methods for dynamically generating multi-factor entity risk assessments within virtualized environments. For example, in an exemplary embodiment, there may be a non-transitory computer readable medium including instructions that, when executed by at least one processor, cause the at least one processor to perform operations for dynamically performing entity-specific security assessments for entities of virtualized network environments. The operations may comprise identifying an entity associated with a virtualized network environment, identifying a plurality of security factors, determining entity-specific weights to the plurality of security factors, generating a composite exposure assessment for the entity, the generating comprising: selecting at least two security factors of the plurality of security factors, identifying the weights corresponding to the selected security factors, and calculating the composite exposure assessment using the selected security factors and corresponding weights, analyzing the composite exposure assessment, and generating at least one of: a security recommendation based on the analysis to alter a scope of privileges of the entity, a notification providing an indication of the composite exposure assessment, or a visual representation of the composite exposure assessment of the entity.

According to a disclosed embodiment, the plurality of security factors may include at least one of a permission type, a usage status of the permission, a target resource type, a target resource security status, or a special entity security risk factor.

According to a disclosed embodiment, the composite exposure assessment may be further based on a customer influence score.

According to a disclosed embodiment, the visual representation may comprise a representation of one or more of the selected security factors of the composite exposure assessment.

According to a disclosed embodiment, the visual representation indicates an effect of the one or more selected security factors on the calculation of the composite exposure assessment.

According to a disclosed embodiment, the visual representation may indicates a composite exposure assessment score threshold.

According to a disclosed embodiment, the selecting at least two security factors of the plurality of security factors may be performed using a machine learning algorithm.

According to a disclosed embodiment, the selecting at least two security factors of the plurality of security factors may be based on an entity classification.

According to a disclosed embodiment, the entity classification may be generated using a machine learning algorithm.

According to a disclosed embodiment, the entity classification may be manually generated.

According to another disclosed embodiment, a method may be implemented for dynamically performing entity-specific security assessments for entities of virtualized network environments. The method may comprise identifying an entity associated with a virtualized network environment, identifying a plurality of security factors, determining entity-specific weights to the plurality of security factors, generating a composite exposure assessment for the entity, the generating comprising: selecting at least two security factors of the plurality of security factors, identifying the weights corresponding to the selected security factors, calculating the composite exposure assessment using the selected security factors and corresponding weights, analyzing the composite exposure assessment, and generating at least one of a security recommendation based on the analysis corresponding to the entity, a notification providing an indication of the composite exposure assessment, or a visual representation of the composite exposure assessment.

According to a disclosed embodiment, the security recommendation may be based on one or more of the selected security factors.

According to a disclosed embodiment, the method may further comprise receiving an indication of acceptance of the security recommendation.

According to a disclosed embodiment, the method may further comprise updating, based on the accepted of the security recommendation, the composite exposure assessment.

According to a disclosed embodiment, the analyzing the composite exposure assessment may comprise comparing the composite exposure assessment with a reference score.

According to a disclosed embodiment, analyzing the composite exposure assessment may comprise determining that the composite exposure assessment does not exceed a score threshold and the security recommendation may comprise a recommendation to maintain a scope of privileges of the entity.

According to a disclosed embodiment, analyzing the composite exposure assessment may comprise determining that the composite exposure assessment exceeds a score threshold and the security recommendation may comprise a recommendation to reduce a scope of privileges of the entity.

According to a disclosed embodiment, the security recommendation may comprise a recommendation to audit privilege usage of the entity.

According to a disclosed embodiment, the method may further comprise generating, based on the security recommendation, a second composite exposure assessment for the entity, the second composite exposure assessment indicating the change in the first composite exposure assessment when the security recommendation is accepted.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
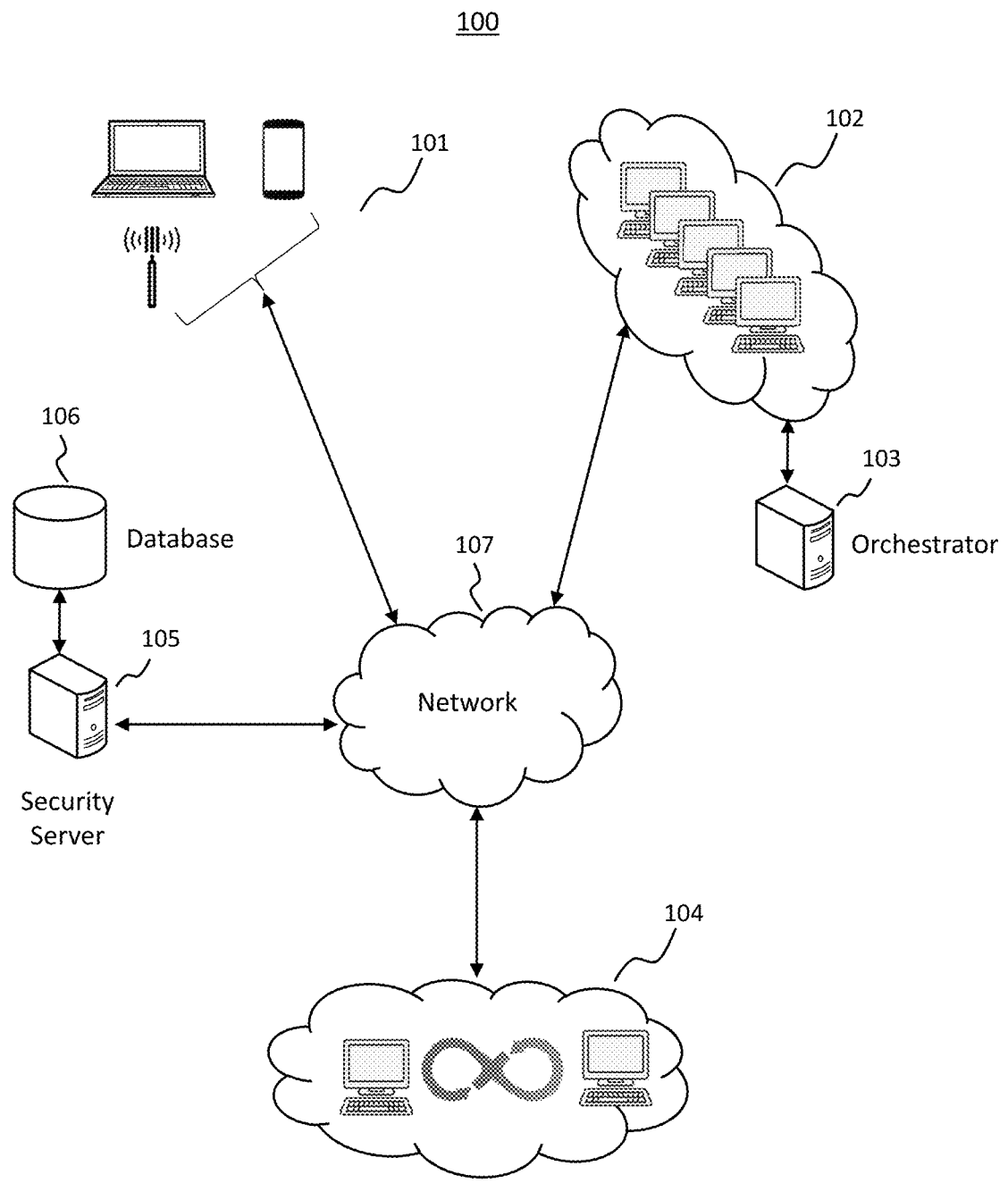
FIG. 1 is a block diagram of an exemplary system for analyzing and addressing least-privilege security threats on a composite basis, in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

In accordance with disclosed techniques, a system may have multiple users, applications, or other types of identities attempting to access a secure resource, such as a cloud computing resource. As discussed further below, an identity may be a user account, machine account, application account, virtual computing resource instance, serverless code instance, or any other type of account that may be associated with a particular user, machine, or application in a computer network. An identity may also be used to gain access to resources of a local machine or computing device, such as a locally installed application or remote desktop. An identity may access the resource using a client computing device, virtual computing instance, or other type of computing resource. In order to grant access to the identity, the resource or another part of the computing system may require authorization and/or authentication of the identity.

Such identities may have different levels of access rights associated with them, ranging from broad access rights (e.g., administrator or root-level privileges) across several platforms to very narrow access rights (e.g., network guest, or temporary accounts). Many identities with broad access rights may be labeled as administrator accounts. Such administrator accounts may be listed in an active directory group (e.g., Microsoft Active Directory™, AWS Managed Microsoft AD™, JumpCloud™ directory, or others) to more easily monitor the accounts with the greatest permissions.

However, so-called "shadow admins" may be created through direct assignment of sensitive privileges, either alone or in combination. Shadow admins may present unique threats to systems because they are not included in the admin directory and are thus harder to identify and track. Further, such shadow admins may not be subject to the same security controls as standard administrators with full access. For example, an identity may have a permission allowing it to create an access key for other accounts. A malicious user with access to this identity could then create a new access key for an administrator account, access the administrator account using the newly generated access key, and then carry out attacks using the administrator account's other sensitive permissions. Thus, any identity having the permission to create an access key may, in some circumstances, need to be subject to the same security protocols as full-access administrative accounts.

Modern computing environments often include numerous different identities. Some or all such identities may be dispersed among on-premises and/or virtualized (e.g., cloud-based) network environments. As the number of active permissions in an environment grows, however, this often leads to a greater attack surface for malicious users and thus a greater potential that a malicious user can cause damage to the environment. It can therefore be advantageous to limit the total number of permissions in any given environment. Ideally, the only permissions existing within the environment would be those that are actively used or required, and such permissions would be monitored according to the potential security threat that they pose. A permission that is not used (e.g., unused to its full scope, unused for a period of time, etc.) presents an unnecessary threat that offers no value to the environment.

In the disclosed embodiments, techniques of analyzing and addressing least-privilege security threats on a composite basis are described. In some embodiments, a least-privilege damage score may be calculated that quantifies the threat that an unused permission poses to a secure entity or environment. In other embodiments, scores for individual permissions may be aggregated to calculate a score for the entity. In further embodiments, scores for multiple entities may be aggregated into a single score for a specific environment. In some embodiments, changes to the permissions or environment may be made based upon the one or more scores.

Disclosed embodiments enable an identity (e.g., application, service, user, etc.) to access and execute functions on a remote resource securely, with least-privileges (i.e., a minimal scope of needed privileges, and/or a minimal duration of privileges). Further, disclosed systems are compatible with protocols enabling remote sessions, e.g., RDP, and HTML5 solutions, as well as protocols supporting tunneling to a remote machine, e.g., SSH port forwarding. Over RDP, for example, the system may use clients such as RD-desktop, Terminal Server Client (TS client), VirtualBox Remote Display Protocol (VRDP)™, Free RDP, or any other RDP client. Alternatively, process execution may be facilitated by an application enabling a remote desktop, e.g., Remote Desktop by Google Chrome™, TeamViewer™, LogmeIn™, or Citrix™, as well as other remote access services. For example, if LogmeIn™ is already installed on the target resource, it may be used to connect to the target resource transparently and perform automatic remote process execution.

Further, in other embodiments, the system may enable an identity to access a group of target resources, e.g., to execute code and/or automated processes on the group of target resources, or to perform other actions. For example, the system may invoke automated execution on a plurality of defined target applications or machines. This may be useful in situations where a common task needs to be performed for a group of resources (e.g., a software update, patch installation, data provisioning, etc.). An identity may also be able to enable automated remote process execution on one or a group of target resources. For example, a user may execute automatic upgrades to existing applications on a target resource; retrieve data from the resource; access files, data, or applications residing on the resource; retrieve metrics stored by or associated with the resource; perform one-time or regular maintenance on the resource; perform and/or schedule a job to execute periodically on the resource; retrieve keystrokes and/or window titles associated with a remote session, without requiring administrator privileges on the resource; and perform various other operations.

In some embodiments, the system may identify a prompt from a client computing device associated with an identity requesting access to a target resource. As disclosed below, a computer device may be any of numerous types of devices with data processing and network communications capabilities. Examples include servers, desktop computers, cloud-computing virtual machines or containers, laptops, smartphones, tablets, personal digital assistants, enterprise digital assistants, smart cards, smart watches, smart bands, smart headphones, computer-embedded clothing, car-computers and other in-vehicle computer equipment, Internet-of-Things (IoT) devices, and any other device with data processing and network connectivity capabilities.

Organizations having large systems may implement a variety of virtualized environments and may include a large number of entities that vary greatly individually. Some entities may have a large number of privileges or have access to highly sensitive resources. Accordingly, entities may be associated with a variety of characteristics or security factors that influence the potential security risk the entity presents to the system. Because of the varied nature of many entities, a single static approach to assessing the entities may not be ideal. In further disclosed embodiments, techniques for dynamically performing entity-specific security assessment for entities of virtualized environments are described. Entity-specific security assessments may be calculated differently for different entities within a system. The assessments may be based on a dynamic selection of a subset of security factors related to the entity. In some embodiments, the assessments may be weighted scores based on entity-specific weights of security factors.

In some embodiments, the entity-specific assessments may be represented by visual representations, which may indicate the security factors used in the assessment and how the security factors influence the assessment. The visual representation may also indicate a potential security risk level of the entity. The visual representations may permit an administrator to easily identify high-risk or low-risk entities, easily compare risks associated with different entities, and decide which entities within the system present the highest risks and, for example, should be addressed first.

Reference will now be made in detail to the disclosed embodiments, examples of which are illustrated in the accompanying drawings.

FIG. 1 is a block diagram of an exemplary system for analyzing and addressing least-privilege security threats on a composite basis. System 100 may include client device 101, cloud computing environment 102, cloud orchestrator 103, DevOps environment 104, security server 105, database 106, and network 107 as shown in FIG. 1. Exemplary implementations of these components are discussed below. While FIG. 1 includes particular numbers or arrangements of these components, in various embodiments the number, arrangement, and presence of such components may vary.

Client devices 101 may include a variety of types of devices, including those capable of communication over a network. As illustrated, client devices 101 may be one or more of a personal computer (e.g., a desktop or laptop), an IoT device (e.g., sensor, smart home appliance, printer, connected vehicle, industrial device, etc.), or a handheld device (e.g., a mobile phone, a tablet, notebook, digital camera, etc.). Client device 101 may also be a vehicle-based or aircraft-based computer, a virtual machine (e.g., virtualized computer, container instance, etc.), a wearable device (e.g., a smart watch, smart jewelry, an implantable device, a fitness tracker, smart clothing, a head-mounted display, etc.), or various other devices capable of processing and/or receiving data. Client devices 101 may also be a server or other network connected computing resource.

In accordance with disclosed embodiments, client devices 101 may be associated with one or more identity. An identity may access, or attempt to access, resources distributed in a computer network and, additionally or alternatively, one or more resources of a local machine or computing device, such as a locally installed application, for example. The identity may also have a number of permissions associated with it that, once authenticated, give the identity access to restricted resources or grant the identity the ability to execute code on the resource, etc.

As described herein, in some embodiments, identities, computer devices, or users may be authenticated before access to and/or control of a target resource is granted or before an identity can cause the target resource to execute code. Authentication may broadly take several forms, such as verification of passwords, SSH keys, asymmetric (e.g., public/private) keys, symmetric keys, Kerberos tickets, Docker signed tags, and other types of cryptographic data or privileged security or access tokens. Further, the authentication may be based on white/black lists for identities or device addresses, or biometric or behavioral information, such as fingerprints, retinal scans, x-rays, biosensors, voice recognition, body movements, walking pace or rhythm, sitting characteristics or patterns, key stroke analysis, and more. In accordance with the disclosed embodiments, the authentication may be single-factor or multi-factor (i.e., a combination of any of the foregoing forms of authentication). Further, as discussed below, the authentication may be performed on the computer device 101, on a remote authentication server (e.g., security server 105), or through a combination of functionality of both.

Cloud computing environment 102 may include one or more virtual machines, which may be based on virtualization tools provided by Amazon Web Services™ (AWS), Microsoft Azure™, IBM Cloud™, Google Cloud Platform™, Cisco Metapod™, Joyent™, vmWare™, or others. Cloud computing environment 102 may include various computing resources, storage resources, security services, developer tools, analytics tools, etc. that may be accessed by client device 101. As an example, AWS™ provides many varying cloud services including searching/analytics (e.g., CloudSearch™), virtual servers (e.g., EC2™), media services (e.g., MediaConvert™) database services (e.g., Aurora™), storage (e.g., S3™), and others. Cloud computing environment 102 may include various entities, machines, or services that include various permissions. Cloud computing environment 102 may be in communication with cloud orchestrator 103. Orchestrator 103 communicates with the different entities or components of cloud computing environment 102 to configure and deploy cloud computing services. In various embodiments, orchestrator 103 may be based on platforms such as AppFormix™, BMC Cloud LifeCycle Management™, IBM Cloud Orchestrator™, AWS CloudFormation™, Kubernetes™, or others.

Client device 101 may communicate with cloud computing environment 102 over a network 107. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, network 107 may be a cloud network, (e.g., private cloud, public cloud, or hybrid cloud network), or a combination of these types of networks. In some embodiments, the communications may take place across two or more of these forms of networks and protocols.

DevOps environment 104 may also be in communication with other components of system 100 through network 107. DevOps environment 104 may implement a DevOps, continuous development, or continuous deployment process. In some embodiments, DevOps or similar processes may be implemented in DevOps environment 104 to continuously develop or deploy new code to configure, update, or replace services or virtual machines within cloud computing environment 102. DevOps environment 104 may include one or more computers, servers, and storage resources used to implement DevOps processes. In some embodiments, new virtual instances within cloud computing environment 104 may be configured or updated through DevOps environment 104 before they are deployed. In various embodiments, DevOps environment 104 may be based on platforms such as Chef™, Puppet™, Ansible™, Splunk™, or others.

System 100 may also comprise one or more security servers 105 in communication with network 107. Security server 105 may perform authentication and/or authorization for various components of system 100. Further, security server 105 may perform the techniques described below in connection with FIGS. 2-5. In an example implementation, security server 105 may be in communication with a client device 101 and cloud computing environment 102 such that security server 105 may grant access to a cloud computing service in cloud computing environment 102 when requested by an identity associated with a user of client device 101. In some embodiments, security server 105 may authenticate and/or authorize the identity for such access. Security server 105 may also manage and store permissions for identities associated with client devices 101. For example, permissions and credentials may be stored using platforms such as CyberArk's Privileged Access Security™, Centrify's Privileged Access Service™, IBM's Security Privileged Identity Manager™, AWS's Identity and Access Management™, Azure's Active Directory Privileged Identity Management™, or various others. Security server 105 may also communicate with database 106. Database 106 may comprise a single database, multiple databases, cloud storage, or other data storage services. In some embodiments, database 106 may be storage local to or integrated with the security server 105. In other embodiments, database 106 may be separate or remote. Database 106 may store lists of permissions, lists or directories of identities, other information associated with identities, etc.

Figure 2:
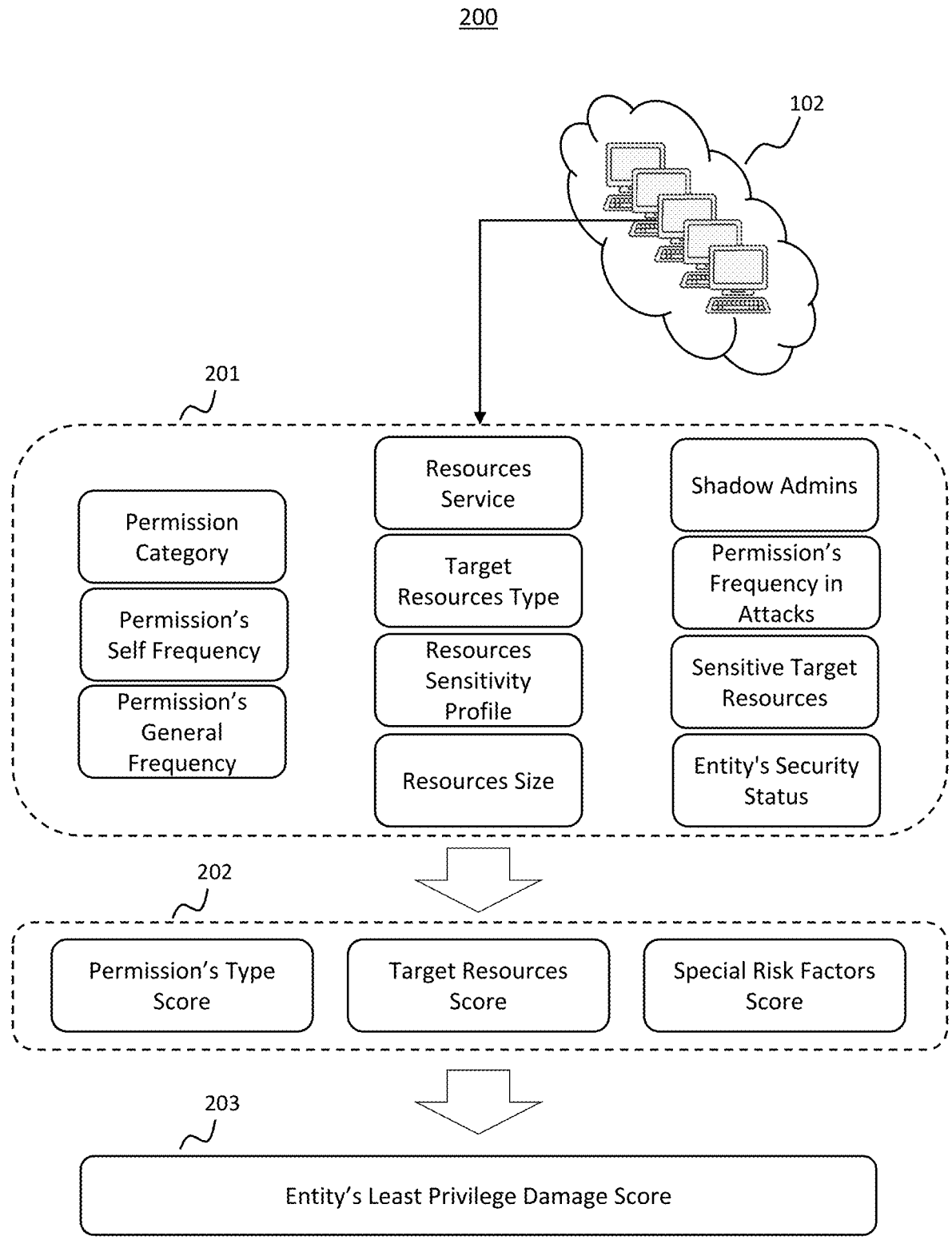
FIG. 2 is an illustration depicting the relationship between different types of least-privilege damage scores, in accordance with disclosed embodiments.

FIG. 2 is an illustration depicting the relationship between different levels of privilege damage scores, as discussed further below. A least-privilege damage score may be a normalized score that quantifies the extent of the security risk or exposure associated with specific permissions of an entity, for example a secure network resource, account, application, etc. The score may also correspond to the severity of the risk, the potential damage that could be caused by exploitation of the permission, the impact of a security breach using the permission, the urgency of making a change to address the potential risk of the permission, etc. As mentioned above, it may be desirable to limit the number of permissions that identities in an environment have to only the permissions that are actually needed for particular authorized functions, and no more (e.g., in scope or time).

Reducing the number of unused permissions may reduce the number of potential avenues of attack for a malicious entity, without affecting legitimate operations in the environment. Thus, in some environments a least-privilege ratio can be calculated that compares the number of unused permissions to the number of total permissions. However, such a score does not take into account any potential differences between permissions. For example, an unused "delete" permission may present a greater risk to a system than an unused "read" permission because a malicious user could cause more harm by gaining access to the delete permission. A least-privilege damage score, as discussed below, may remedy this deficiency by addressing the amount of risk presented by a specific permission given the particular configuration of an environment.

As discussed above, cloud computing environment 102 may include, for example, a cloud computing service with a plurality of permissions associated with one or more virtualized identities. Group 201 of FIG. 2 illustrates the different least-privilege damage sub-scores that may be calculated for each permission. Sub-scores may be calculated based upon the permission's type, the affected resources, special risk factors, or other considerations. For example, an individual sub-score for each permission may be calculated for each one of the considerations shown in group 201. Thus, as illustrated in FIG. 2, for a given permission, a separate sub-score may be calculated based upon the permission's category, the permission's self-frequency, the permission's general frequency, the resource's service, the target resource's type, the resource's sensitivity profile, the resource's size, presence of or possibility of shadow administrators, the permission's frequency in attacks, unusually sensitive target resources, the security status of an entity associated with the permission, etc. While this list is not exhaustive, each of the exemplary sub-scores listed are discussed in greater detail below. In some embodiments, one or more of the sub-scores may be automatically assigned. For example, a machine learning algorithm may be used to learn the attributes, usage, etc. of different permissions for different entities, then assign sub-scores based upon that information. In some embodiments, one or more of the sub-scores may be manually configured.

Different types of permissions may be broken down into a plurality of predefined categories corresponding to different risk levels. For example, "list" and "describe" permissions (and other read-only permissions) may receive a category risk level of 1 (low), while "create user" and "delete user" permissions may receive a category risk level of 5 (high), thus creating a range of possible sub-scores based on the permission's category. A permission's self-frequency sub-score may be based upon a determination of how ordinary and frequent it is for the permission to be used by the particular identity it is associated with. For example, an entity using CreateGroup and CreateRole permissions in the past, would be reasonably expected have the CreateUser permission, thus the self-frequency potential damage score would be relatively low compared to an identity that has the CreateUser permission but has never used a "create" permission before. Similarly, a permission general frequency sub-score may be based upon a determination of how often the permission is used overall in the entire environment. For example, a more sensitive permission would often be used less frequently and used by fewer identities in the environment, and thus would receive a higher sub-score for being a more sensitive permission.

Separate sub-scores may also be calculated for the considerations related to the affected resources. The affected resource may be the target resource to which the permission grants access, ability to update, ability to alter, etc., for example, a cloud computing service, computing device, database, or similar resource. The resource's service sub-score may be based upon pre-assigned groupings of different services. Similarly, a service type sub-score may be calculated based upon the type of service offered. For example, search tools may present less risk and thus have lower service type sub-scores than storage services or authentication resources. A sub-score may also be calculated for the target resource's sensitivity profile. The sensitivity profile sub-score may be based upon a pre-defined score quantifying how sensitive the target resource is to attack. For example, a publicly available resource may be less sensitive than a resource containing secret data and/or requiring authentication for access. Accordingly, the publicly available resource may have a lower sensitivity profile sub-score. A sub-score may also be calculated based upon the size of the target resource(s). For example, if the permission affects a small number of resources or identities, it may have a lower target resource size sub-score than a permission affecting hundreds of resources or identities.

Separate scores may also be calculated for the considerations related to other special risk factors. Special risk factors may include the presence of or possibility of shadow admins, the permission's frequency in attacks, unusually sensitive target resources, or the security status of entity the permission. For example, a shadow admins sub-score may be high if the permission has the equivalent power of full administrative or root privileges. In some embodiments, the shadow admin sub-score may be a binary score, i.e., either 1 or 0, or either yes or no, indicating that the entity either is or is not a shadow admin. In some systems, a certain permission may have been used in past attacks. Thus, a sub-score may be calculated based upon the permission's frequency in previous attacks, giving a higher score to permissions that are likely to be used in an attack again. An unusually sensitive target may be, for example, a database containing extremely sensitive information. Thus, even a "read" permission on such a sensitive database may have an unusually high damage potential. The entity's security status sub-score may also relate to the type of security implemented by the entity associated with the permission. For example, if the entity with the unused permission is not secure, it may have a higher probability of being compromised, and thus may be assigned a higher damage sub-score. In some embodiments, this score may be calculated based upon an assessment of the parameters of a privileged access security system, including password age, credentials complex policy, automatic credential rotation, multi-factor authentication, credential protection in the endpoints or servers, the number of people with access to the entity's credentials, the number of employees with access to the entity's password, whether the credentials are being used directly in code, etc.

In some embodiments, one or more of the sub-scores may be combined to form aggregate scores 202. Aggregate scores may be created by normalizing and weighting sub-scores. For example, a permission's sub-scores corresponding to permission category, permission self-frequency, and permission general frequency may be combined to form a weighted aggregate Permission's Type Score. Similarly, a permission's resource's service, target resource type, resource sensitivity profile, and resource size may be combined to form an aggregate Target Resources Score. Likewise, in some embodiments, the permission sub-score corresponding to the presence of or possibility of shadow admins, the permission's frequency in attacks, unusually sensitive target resources, and the security status of entity the permission may be combined to form an aggregate Special Risk Factors Score.

To calculate the aggregate scores 202, each sub-score within group 201 may be assigned an absolute or relative weight. For example, the more critical scores may receive a weight of 50, while the less critical scores may receive a weight of 5. The sub-score 202 may then be calculated using the different separate scores, which may be weighted and normalized into a single score. An exemplary equation for calculating the weighted aggregate Permission Type score is shown below, where N1 corresponds to the maximum permission category sub-score, N2 is the maximum permission self-frequency sub-score, and N3 is the maximum permission general frequency sub-score. In some embodiments, other aggregate scores may be calculated in a similar manner. Weights may be assigned manually or automatically. In some embodiments, the weights may be dynamically adjusted, by, for example, a machine learning algorithm.

The criteria for whether a permission is considered unused may be configurable by the system, for example, by security server 105. In some embodiments, process 300 may determine that a permission is unused if the permission has never been used before. In further embodiments, process 300 may determine that a permission is unused if the permission has not been used with a certain period of time defined by the system. As an example, if a permission has not been used in the previous 3 months, process 300 may consider the permission unused. In some embodiments, the determination of whether a permission is used may be indicated by a usage status of the permission. The usage status may be a binary value (i.e., either 1 or 0, or either yes or no) indicating that the permission is either used or unused. In other embodiments, the usage status may be a sliding scale that indicates how much the permission is used (e.g., a scale of 1 to 10, with 1 being never used and 10 being used very frequently). In such embodiments, the system may a set threshold value to decide if a permission is used or unused. For example, a $$\frac{(\text{Permission Category score}) \times (\text{weight1}) + (\text{Self Frequency score}) \times (\text{weight2}) + (\text{General Frequency score}) \times (\text{weight3})}{N1 \times (\text{weight1}) + N2 \times (\text{weight2}) + N3(\text{weight3})}$$

Calculating the score using the equation shown above may result in an aggregate least-privilege damage score with a value between 0 and 1. The closer a permission's score is to 1, the higher the potential damage the permission may cause. Likewise, the closer a score is to 0, the lesser the potential damage. Other variations on this equation, and the resulting score range, are possible as well.

In some embodiments, aggregate scores 202 that correspond to an entity may be combined to form the Entity's Least-Privilege Damage Score 203. The Entity's Least-Privilege Damage Score 203 is described in greater detail with respect to FIG. 3, below.

Figure 3:
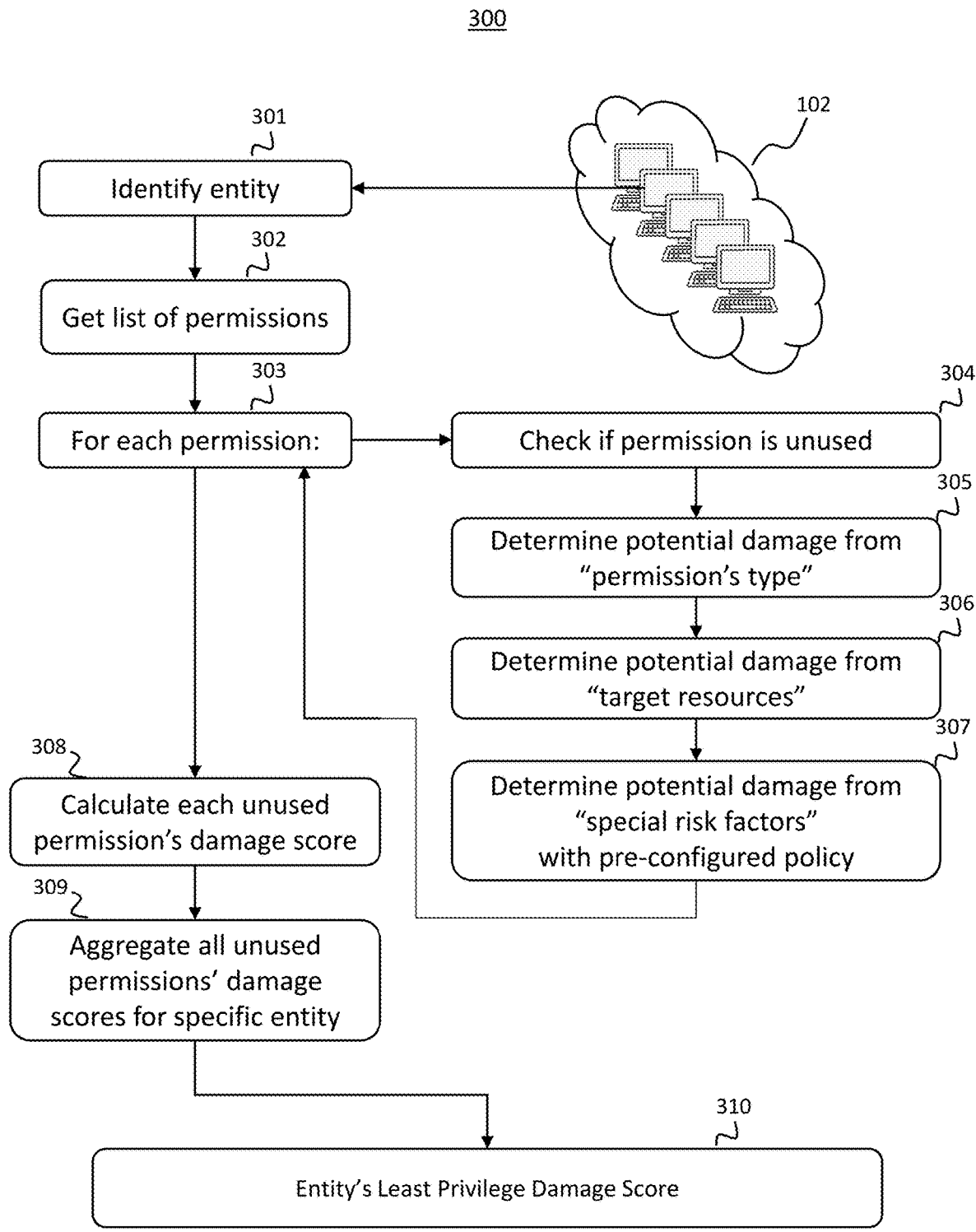
FIG. 3 is a flowchart depicting an exemplary process for calculating an entity's least-privilege damage score, in accordance with disclosed embodiments.

FIG. 3 is a flowchart depicting an exemplary process 300 for calculating an entity's least-privilege damage score. Process 300 may be carried out by, for example, security server 105 as discussed above in connection with FIG. 1. At step 301, process 300 may include identifying an entity (e.g., network identity) associated with cloud computing environment 102 that has one or more permissions. Consistent with the discussion above, this may include accessing a network directory service (e.g., Microsoft Active Directory™, AWS Managed Microsoft AD™, JumpCloud™ directory, etc.) or a cloud orchestration service (e.g., cloud orchestrator 103). At step 302, process 300 may retrieve a list of permissions associated with the entity. In some embodiments, the list of permissions may be retrieved from security server 105. In some embodiments, the security server 105 may retrieve the permissions list from database 106. For example, as discussed above, security server 105 and/or cloud orchestrator 103 may manage permissions using platforms such as CyberArk's Privileged Access Security™, Centrify's Privileged Access Service™, IBM's Security Privileged Identity Manager™, AWS's Identity and Access Management™, Azure's Active Directory Privileged Identity Management™, or various others.

At step 303, process 300 may iterate through a plurality of sub-steps, 304-307, for each permission identified in the list of permissions. In step 304, process 300 may determine if the permission is unused. The determination of whether a permission is unused may be based on an assessment of one or more parameters associated with the use of permission.

system may set a threshold of 4, meaning that any permission having a usage status value of less than 4 is considered unused.

If process 300 determines that a permission is unused, it may advance to step 305. If process 300 determines that a permission is used, process 300 may move on to evaluate another permission within the list of permissions.

In step 305, process 300 may determine the potential damage from the permission's type. The potential damage may be quantified as a score, level, category, etc. As discussed above with respect to FIG. 2, a permission type score may be calculated based upon one or more sub-scores associated with the permission, including permission category, permission self-frequency, permission general frequency, or others.

In step 306, process 300 may determine the potential damage based on the target resources associated with the entity and/or the privilege. The potential damage may be quantified as a score. As discussed above with respect to FIG. 2, a target resource score may be calculated based upon one or more sub-scores associated with the permission, including the resource's service, target resources type, resource's sensitivity profile, and resource's size.

In step 307, process 300 may determine the potential damage based on special risk factors. The potential damage may be quantified as a score. As discussed above with respect to FIG. 2, a target resource score may be calculated based upon one or more sub-scores associated with the permission, including the potential for shadow admins, permission's frequency in attacks, sensitive target resources, and the entity's security status. The determination may be based upon pre-configured policies that define special risk factors or the scores associated with the special risk factors.

In step 308, process 300 may calculate a least-privilege damage score for each unused permission. In some embodiments, the least-privilege damage score may be calculated by weighting and combining the potential damage scores from the permission's type, target resources, and special risk factors, calculated in steps 305-307 above. The score may be calculated using, for example, the techniques discussed above. The score may be expressed as a numerical value (e.g., between 0 and 1, or 1 and 100), a percentage, a level, a category, etc.

In step 309, process 300 may aggregate all of the unused permissions' damage scores calculated in step 308. In step 310, process 300 may output the entity's least-privilege damage score, calculated from the aggregate of the of the unused permissions' damage scores for the entity. In some embodiments, the permission scores may be weighted when calculating the entity's least-privilege damage score. As discussed above with respect to FIG. 2, weights may be assigned manually or automatically by the system. In some embodiments, the weights may be dynamically assigned by, for example, a machine learning algorithm.

Figure 4:
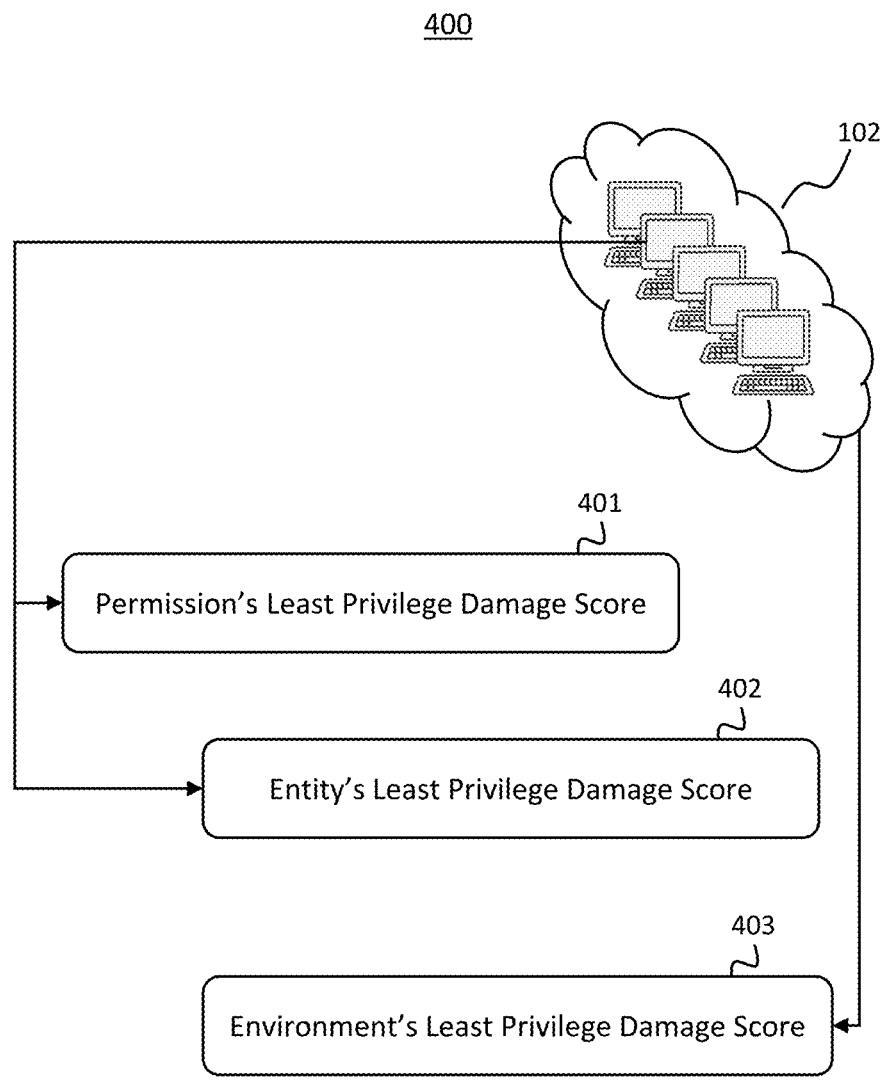
FIG. 4 is an illustration depicting multiple types of least-privilege damage scores, in accordance with disclosed embodiments.

FIG. 4 is an illustration of a system 400 depicting multiple types of least-privilege damage scores. A permission least-privilege damage score 401 may be calculated for each permission associated with an entity within cloud computing environment 102. As discussed above with respect to FIGS. 2 and 3, an entity's least-privilege damage score 402 may be calculated by aggregating the permission least-privilege damage scores 401 for each permission associated with the entity. Similarly, an environment's least-privilege damage score 403 may be calculated by aggregating the entity least-privilege damage scores 402 for each entity associated with the environment. Such aggregate scores may be calculated similarly to the equation discussed above with respect to FIG. 2. In some embodiments, the entity scores may be weighted such that the more sensitive or important entities are given more weight than less critical entities.

In some embodiments, least-privilege damage scores may be compared in order to prioritize which permissions/entities/environments should be addressed first or on a prioritized basis. For example, aggregate scores for several different entities may be compared. The entity with the highest score (most at risk), may be addressed first, consistent with FIG. 5, below. Then, the system may compare the scores corresponding to different permissions associated with the entity. The permission within the entity with the highest score may then be the first permission addressed by the system. Such prioritization permits the system to act most efficiently by addressing the most at-risk permissions/entities/environments first. In some embodiments, security server 105 may implement machine learning algorithms to more efficiently assign sub-scores, compare scores, and prioritize permissions/entities.

Figure 5:
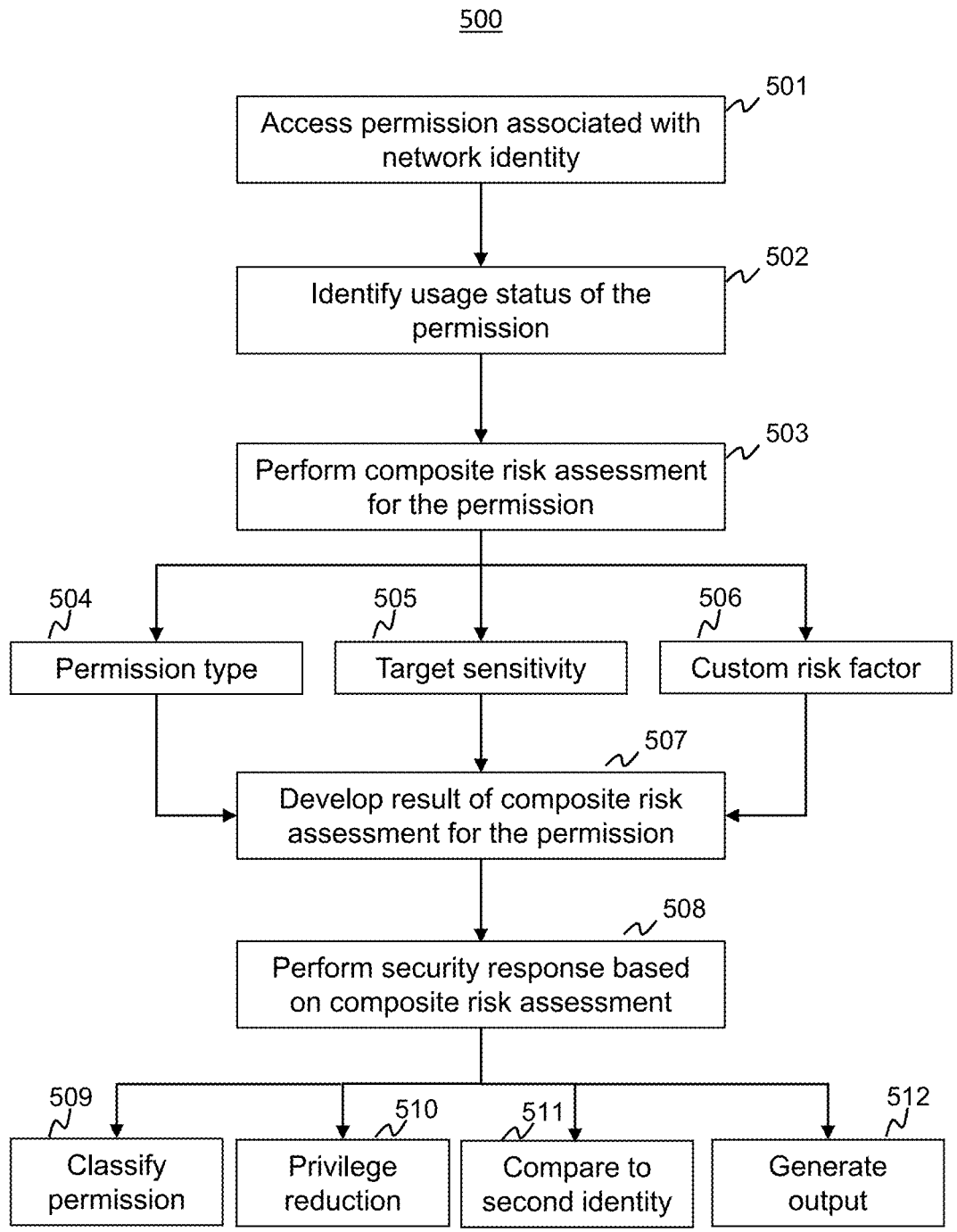
FIG. 5 is a flowchart depicting an exemplary process for performing a composite risk assessment and generating a security response, in accordance with disclosed embodiments.

FIG. 5 is a flowchart depicting an exemplary process 500 for performing a composite risk assessment and generating a security response. Process 500 may be executed by, for example, security server 105 as shown in FIG. 1. Process 500 may correspond to parts of FIGS. 2-4, and accordingly, descriptions of the components and processes therein may apply to process 500 as well. At step 501, process 500 may access a permission associated with a network identity. The network identity, for example, may be associated with client device 101.

At step 502, process 500 may include identifying a usage status of the accessed permission. The usage status, as described above with respect to FIG. 3, may be determined based upon, for example, whether the permission has ever been used, the number of times it has been used, whether the permission has been used within a specific time period, etc. In some embodiments, the usage status may be calculated based upon multiple factors. In some embodiments, the usage status may be a number that may be compared to a threshold value. In some embodiments, the usage status threshold value may be determined by the security server 105. If the usage status is below the threshold value, process 500 may continue to step 503. In some embodiments, if the usage status exceeds the threshold value, process 500 may not continue to step 503 and may not perform the composite risk assessment.

At step 503, process 500 may commence performing a composite risk assessment for the permission. The composite risk assessment may include identifying attributes of the permission (steps 504-506). Several examples of attributes of permissions were discussed above with respect to FIG. 2. Process 500 may further execute one or more of steps 504-506. At step 504, process 500 may identify a permission type. The permission type may include the function of the permission, for example, read, write, delete, create, list, describe, get, enable, tag, untag, deactivate, add, update, attach, etc. Permission type may also identify the frequency of use of the permission by a specific identity (self-frequency) or the frequency of usage of the permission by multiple identities (general frequency).

At step 505, process 500 may identify a target sensitivity. In some embodiments, the target sensitivity may be based upon a predefined classification of sensitivity. Predefined classifications of sensitivity may include publicly available resources, restricted resources, or restricted resources with secret data. Classifications may be defined such that most sensitive resources are given a higher classification score. The target sensitivity may also include a sensitivity score determined for the target resource. In further embodiments, the target sensitivity may be based on the size of the target resource. As discussed above with respect to FIG. 2, a smaller target resource may be less sensitive to attack.

At step 506, process 500 may identify one or more custom risk factors. In some embodiments, a custom risk factor may address whether the permission corresponds to a designated sensitive administrator privilege. As discussed above with respect to FIG. 2, a sensitive administrator privilege may be, for example, one that gives the identity full administrative or root power over the entity or the ability to create additional users. In some embodiments, the customized risk factor may address whether the permission corresponds to a designated sensitive target network resource. For example, a designated sensitive target network resource may be a database containing highly sensitive or secret information or an authentication resource that controls access to multiple entities. Such designated sensitive target resources may warrant greater security and may thus receive higher risk scores. In yet further embodiments, the customized risk factor may address whether the permission corresponds to a historical attack permission. A historical attack permission may be, for example, a permission that has been used in one or more previous malicious attacks waged on the corresponding entity or on other entities or environments. The custom risk factor may also correspond to a security status of the entity. In some embodiments, entities with greater security measures already in place may receive a lower score, indicating they are less susceptible to attack. For example, an entity with systems in place such as multi-factor authentication or CyberArk's Privileged Access Security™ Solutions may receive a lower score than entities without such security measures in place.

At step 507, process 500 may develop a result of the composite risk assessment for the permission. The result may be based upon the one or more permission attributes identified in steps 504-506. For each permission attribute identified in any one of steps 504-506, process 500 may create a corresponding potential damage score, as discussed above with respect to FIGS. 2-4. In some embodiments, the result may be a combination of the permission type, target sensitivity, or custom risk factor scores. Such a score may be calculated by assigning different weights to the permission type, target sensitivity, or custom risk factor scores and combining them into a single weighted score.

At step 508, process 500 may perform a security response based on the composite risk assessment. In some embodiments, based upon the score generated at step 507, process 500 may proceed to one or more of steps 509-512. In some embodiments, two or more of steps 509-512 may be performed simultaneously. In other embodiments, the steps may be performed sequentially. In yet further embodiments, process 500 may perform just one of steps 509-512.

At step 509, process 500 may classify the relevant permission. For example, based on the calculated score, the permission may be classified as a high-risk permission that likely needs to be removed. In other cases, the permission's score may be relatively low, which may cause it to be classified as, for example, a low-risk permission, which may not need to be altered.

At step 510, process 500 may reduce privileges associated with the permission. In some embodiments, if the score is relatively high, privileges for the corresponding identity might be reduced.

At step 511, process 500 may compare the score associated with the permission to a score of a permission associated with another identity. In some embodiments, the score associated with the permission may be compared to a score associated with another permission of the same identity. Such a score comparison may be possible because the scores for each permission are normalized. In some embodiments, process 500 may prioritize security responses based upon the comparison. For example, two scores corresponding to permissions from two different identities may be compared. The permission with the higher score, thus presenting a higher damage risk, may be prioritized such that it would be addressed first.

At step 512, process 500 may generate an output, such as a security report, alert, or least-privilege damage score report. In some embodiments, the output may be transmitted to security server 105. Security server 105 may evaluate the output and determine whether to take action and, if action is warranted, what action to take. For example, security server 105 may receive a least-privilege damage score report indicating that one entity has several unused high-risk permissions capable of causing great damage. The security server 105 may then cause those permissions to be revoked. In some embodiments, evaluations of the output and corresponding actions may happen automatically without sending the output to security server 105.

It is to be understood that process 500 may be performed for single permissions or multiple permissions. In some embodiments, process 500 may be performed for multiple permissions simultaneously. In further embodiments, process 500 may access multiple permissions at step 501 and may execute the process 500 for the multiple permissions, creating aggregate scores as described with respect to FIGS. 2-4. For example, process 500 may be conducted for all permissions present within a certain entity, or an entire network environment.

Figure 6A:
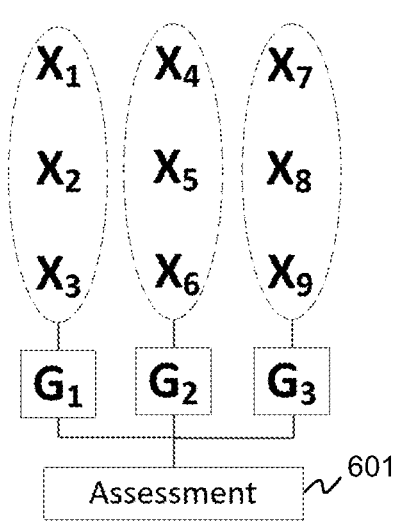
FIGS. 6A-6D are illustrations depicting components of an exemplary exposure assessment, in accordance with disclosed embodiments.

FIG. 6A is an illustration depicting components of an exemplary exposure assessment 601, in accordance with disclosed embodiments. An exposure assessment may be a normalized score that quantifies the extent of the security risk or exposure associated with an entity, for example a secure network resource, account, application, user, etc. The score may also correspond to the severity of the risk, the potential damage that could be caused by compromising the entity, the impact of a security breach using one or more of the entity's permissions, the urgency of making a change to address the potential risk of the entity, etc. As mentioned above, it may be desirable to limit the number of permissions that entities in an environment have to only the permissions that are actually needed for particular authorized functions, and no more (e.g., in scope or time). Reducing the number of unused permissions may reduce the number of potential avenues of attack for a malicious entity, without affecting legitimate operations in the environment. Thus, it may be desirable to be able to compare quantitatively compare the various entities of an environment to determine which entities expose the environment to the most risk and thus should be addressed first. For example, an entity with a small number of highly sensitive permissions may be more dangerous to the environment than an entity with a large number of unused "read" permissions. An exposure assessment may address this issue by permitting quantitative comparison of the entities to permit easy identification of the highest risk entities and facilitate security responses to reduce the exposure of the highest risk entities in a prioritized manner.

Entity-specific exposure assessments may take a variety of forms. In some embodiments, the exposure assessment may be presented as a percentage (i.e., a percentage score with the range of 0 to 100%). In other embodiments, as described herein, the exposure assessment may be a normalized numerical score. A normalized numerical score may be, for example, a whole number or a fractional number representing the exposure of the entity. A normalized numerical score may be calculated with reference to a specified scale (e.g., a scale of 1 to 50, with 1 being the minimum score and 50 being the maximum). A higher exposure assessment score may indicate that the entity presents a higher security risk to the system or environment.

Exposure assessments may be calculated based on one or more security factors. Security factors may be, for example, sub-scores 201 of FIG. 2, such as Permission Category, Permission's Self Frequency, Permission's General Frequency, Resources Service, Target Resources Type, Resources Sensitivity Profile, Resources Size, Shadow Admins, Permission's Frequency in Attacks, Sensitive Target Resources, and Entity's Security Status. As described herein, each of these sub-scores may relate to various permissions associated with the entity for which the exposure assessment is being conducted. Other security factors are possible, for example, the exposure assessment may be based on the total number of permissions of the entity, the number of unused permissions, associated security or authorization methods (e.g., password strength, multi-factor authentication, and the like), the number of associated resources, and other factors that may indicate of the risk presented by an entity.

While in some embodiments, for example, as described above with respect to FIG. 3, the security factor scores may be determined for individual unused permissions, then combined into a damage score for each permission, which can be aggregated to form a damage score for the entity, other methods may be used. For example, the security factor scores may be determined based on an average score for the factor across all permissions associated with an entity. In some embodiments, rather than calculate individual security factor scores for each permission, then create three aggregate scores 202 for each permission, and finally combine all of the aggregate scores 202 into an entity's exposure score, the factor scores 201 may be calculated as an individual average score for the entity across all of its permissions. For example, each of the entity's permissions may be assigned a score based on its permission category. A read permission may be assigned a score of 1, while a delete permission or a create permission may be assigned a score of 10. The category scores for each permission may be averaged and normalized to result in a single permission category score for the entity. Similarly, a single score for each other of sub-scores 201 (such as target resource type, resource size, etc.) may be calculated for a given entity.

As disclosed herein, these individual factor scores may be grouped together into a group or aggregate score for the entity. Scores related to permissions themselves, such as permission category, frequency of use, number of permissions actually used by the entity, may be grouped into a "permission" factor group score. Similarly, scores related to the target resources, such as those relating to the resource's service, the type of target resource, a sensitivity of the target resource, the size of the resource, and others, may be grouped into a "target resources" factor group score.

Other factor groupings are possible. For example, scores related to the context of a specific action may be grouped together into a group or aggregate score for the entity. Scores related to the timing of the action (during regular operation hours or outside work hours), the environment in which the action was performed (production or non-production workload), may be grouped into a "context" factor group score. Other groups may include one or more scores related to other characteristics or indications related to identities or resources. As an example, an action taken on a resource may be detected as suspicious, for example, by a machine learning system for detecting anomalous actions. A score related to an indication of such anomalous activity may be included in a special security group score or its own "suspicious activity" group score.

In some embodiments, security factors may be grouped. Similar security factors may be grouped to permit further customization of an exposure assessment. Instead of being determined directly from individual security factors, the exposure assessment may be determined by a weighted average of the group scores. For example, groups may be weighted to provide a greater influence on the exposure assessment to a group that has a greater effect on the security of the corresponding entity. In some embodiments, individual factor scores may be grouped into a special factor score. As an example, the factors of the special factor score may indicate an entity's security risk, but not fit well into another grouping. As another example, the special factors may be factors that may more strongly indicate a high risk for the entity, if present. One such special factor may be if the entity is considered a "shadow admin." Being a "shadow admin" may not be common among entities within a system, but entities that are "shadow admins" may present a significantly higher security risk to the system.

In some embodiments, the special factor score may be used as a modifier to a calculated exposure assessment. For example, rather than be a factor group score that serves as a component of the initial exposure assessment calculation, a special factor score may be used to increase or decrease the exposure assessment by a certain percentage, or otherwise modify the exposure assessment.

FIG. 6A depicts the relationship between exemplary security factors X1 to X9, exemplary groups G1 to G3, and an exemplary exposure assessment 601.

Security factors X1 to X9 may represent one or more of the various security factors described herein, for example, any of sub-scores 201. As illustrated in FIG. 6A, security factors may be grouped into a plurality of groups upon which the exposure assessment 601 may be based. In some embodiments, groups may correspond to aggregate scores 202 of FIG. 2. In the illustration of FIG. 6A, security factors X1, X2, and X3 may be related and grouped into group G1. For example, X1 may be a security factor indicating the permission categories for permissions of the entity, X2 may be a security factor indicating an average frequency of the entity's use of its permissions, and X3 may be a security factor indicating a general usage frequency of the entity's permissions (i.e., the average frequency with which other entities use similar permissions). Thus, group G1 may correspond to a "Permission Type" group that indicates the exposure of the entity arising from the entity's number of and type of permissions. Likewise, security factors X4, X5, and X6 may be related and grouped into group G2. Group G2, for example, may relate to exposure arising from the resources upon which an entity is permitted to act. Group G3 may similarly comprise related security factors X7, X8, and X9.

Groups G1, G2, and G3 may be used to determine an exposure assessment 601 for a corresponding entity. For example, as described in greater detail below, Groups G1, G2, and G3 may each be assigned a weight. Then, the exposure assessment 601 may be calculated as a weighted average of the three group scores. The weights for the group scores may be entity-specific. For example, some entities may be influenced more by permissions than by the corresponding target resources. Thus, in the example described above, the weight corresponding to group G1 may be higher than the weight corresponding to group G2.

Figure 6B:
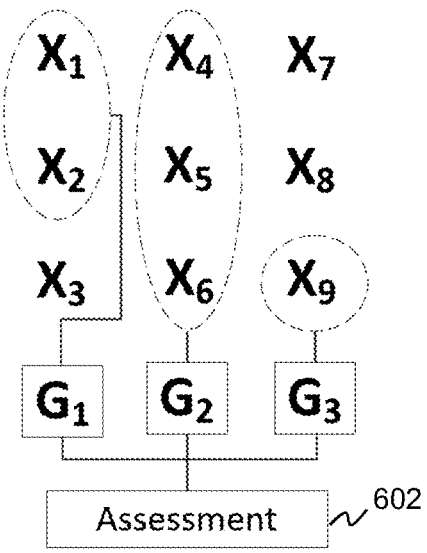

While FIG. 6A illustrates a situation in which all security factors associated with an entity are included in the entity's exposure assessment 601, in some embodiments, the exposure assessment may be based on a subset of the security factors. For example, certain security factors may not be relevant for a given entity. Accordingly, to generate a more accurate exposure assessment for the entity, the irrelevant security factors may not be included in the formation of the exposure assessment. FIG. 6B is an illustration depicting components of an exemplary exposure assessment 602, in accordance with disclosed embodiments. In contrast with FIG. 6A, not all of security factors X1 through X9 of FIG. 6B are included in the exposure assessment 602. Group G1 contains factors X1 and X2, but not X3. Similarly, group G3 contains only X9. The exclusion of factors X3, X7, and X8 from any of the factor groups may indicate that these factors are not relevant to the corresponding entity. Accordingly, they will not be factored into the entity's exposure assessment 602 determined from the groups.

Figure 6C:
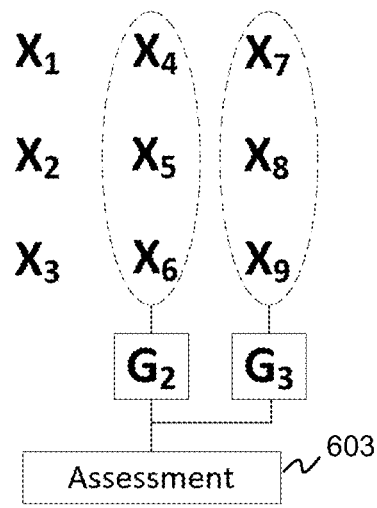

FIG. 6C is an illustration depicting components of an exemplary exposure assessment 603, in accordance with disclosed embodiments. In some embodiments, an entire group of factors may not be relevant to a given entity. Accordingly, as depicted by FIG. 6C, a group of related factors (X1 through X3) may be excluded from the calculation of exposure assessment 603. Thus, in contrast with exposure assessments 601 and 602, exposure assessment 603 may be based on two factor groups (as depicted, groups G2 and G3).

Figure 6D:
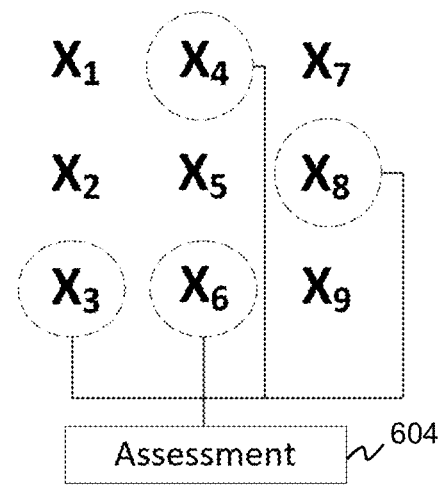

While the other exemplary exposure assessments 601-603 of FIGS. 6A-6C are depicted as being based on three intermediate group scores, in some embodiments, the intermediate group scores may not be calculated. Instead, the exposure assessment may be calculated directly from individual factor scores by weighting and normalizing them. FIG. 6D is an illustration depicting components of an exemplary exposure assessment 604, in accordance with disclosed embodiments. Exposure assessment 604 is directly based on individual ungrouped security factors X3, X4, X6, and X8. Thus, rather than be based on a weighted average of one or more group scores, exposure assessment 604 is based directly on weighted average of normalized security factors X4, X6, and X8.

Figure 7:
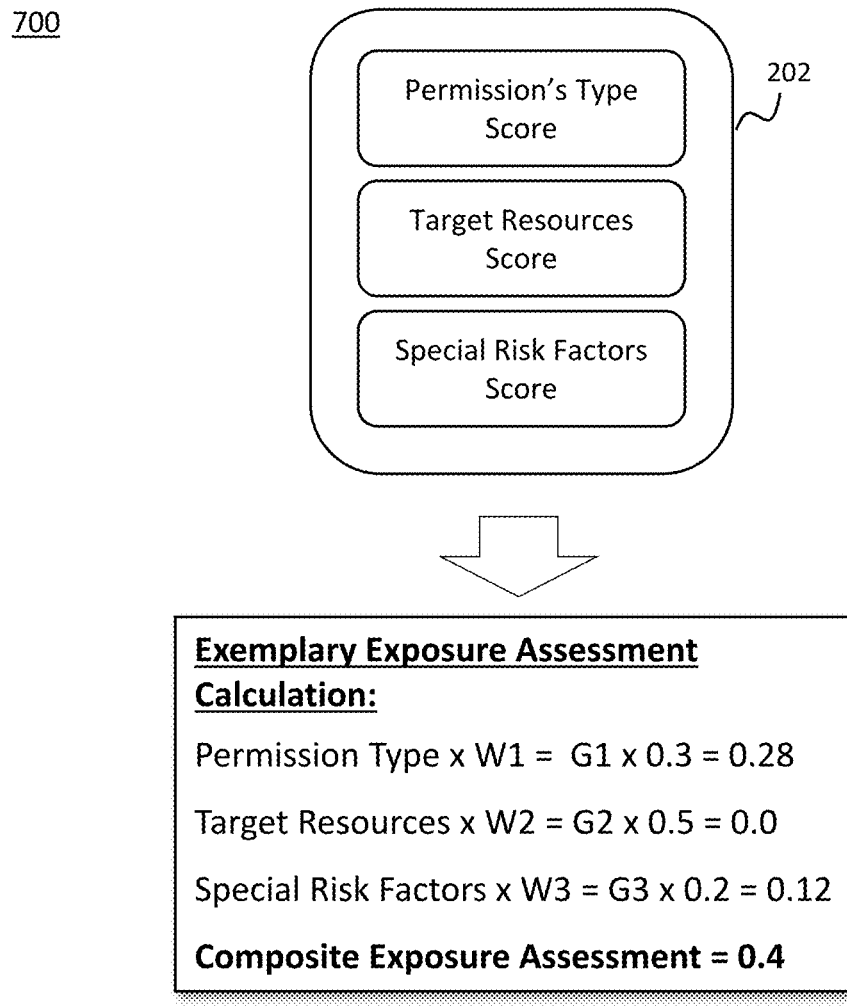
FIG. 7 is an illustration depicting an exemplary exposure assessment and visual representation, in accordance with disclosed embodiments.
Figure 7:
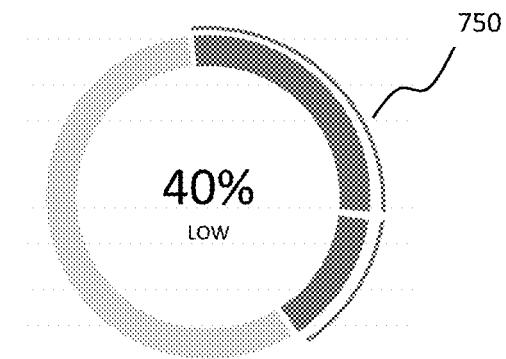
Figure 8:
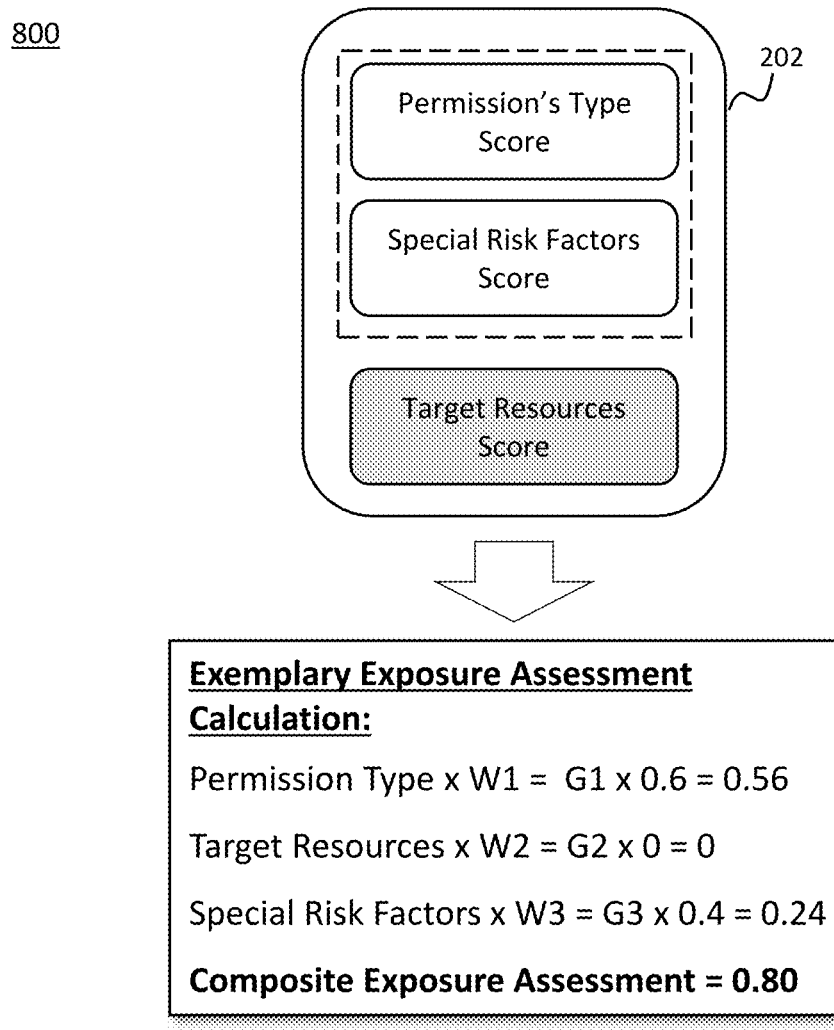
FIG. 8 is an illustration depicting an exemplary exposure assessment and visual representation, in accordance with disclosed embodiments.
Figure 8:
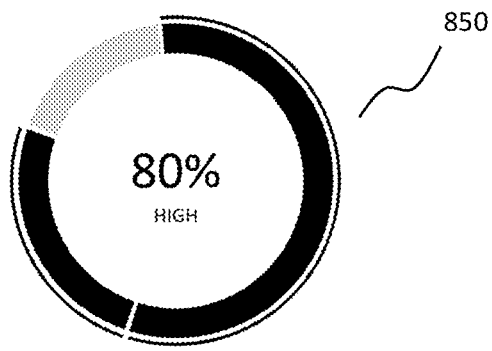

FIG. 7 is an illustration 700 depicting an exemplary exposure assessment and visual representation 750, in accordance with disclosed embodiments. As described herein, an exposure assessment may be calculated as a weighted average of one or more group scores. In some embodiments, the group scores may be aggregate scores 202. Each group score of aggregate scores 202 may be associated with a weight, which may be entity-specific, as described in greater detail below. The weights may be determined such that the total of the weights equals 1 (i.e., the weights total to 100%). As illustrated by FIG. 7, an exemplary composite exposure assessment may be calculated from three factor group scores: a permission type score, target resources score, and a special risk factors score. Each group score may be assigned a weight, W1, W2, and W3, respectively. Each group score may be multiplied by its weight, as described herein, to result in a weighted group score. The three weighted group scores may be aggregated to calculate the given entity's composite exposure assessment. In the example of FIG. 7, the entity's target resources group score may not be relevant to the specific entity being assessed. Thus, the entity's target resources group score may be zero, or very close to zero. Depending on its corresponding weight, the target resources group score could greatly influence the ultimate exposure assessment, even though it is irrelevant. In the FIG. 7, the entity's exposure score may be relatively low, even though the entity could be a high-risk entity for other reasons, because it includes a relatively higher weight of the irrelevant target resources group score. The relatively low exposure assessment may be visualized using a visual representation 750. Visual representations are described in greater detail below with reference to FIGS. 9 and 10. FIG. 8 provides an example of how the issue of including an irrelevant factor group in an exposure assessment could be rectified through an alternative calculation of the entity's exposure assessment.

FIG. 8 is an illustration depicting an exemplary exposure assessment and visual representation 850, in accordance with disclosed embodiments. As mentioned above, FIG. 8 may represent an exposure assessment calculation for the same entity as that of FIG. 7. However, FIG. 8's calculation may exclude the irrelevant target resources group score from it's calculation and thus use different weights for the permission type factor group and the special risk factor group. These two factor groups may be weighted more heavily in the exposure assessment calculation, resulting in a higher (and potentially more accurate) exposure assessment. The 80% calculation of FIG. 8 is relatively higher than the 40% assessment of FIG. 7. Therefore the FIG. 8 assessment may indicate that the entity is higher exposure or higher risk than the 40% exposure assessment of FIG. 7. This higher exposure of FIG. 8 may also be indicated by visual representation 850, representing the 80% exposure assessment. While FIGS. 7 and 8 describe excluding a factor group, as explained above with reference to FIGS. 6A-6D, in some embodiments, exposure assessments may be influenced by excluding individual security factors from the calculation.

Consistent with disclosed embodiments, a composite exposure assessment may be based one or more customer influence score. A customer influence score may be, for example, a score indicating a preference of human user associated with an entity, a system, or environment. By way of example, a system administrator may define a customer influence score to influence exposure assessment for entities with the system. As another example, the customer influence may be entity-specific and server as a modifier only for the exposure assessments of the corresponding entity. In some embodiments, the customer influence score may serve as an additional factor or factor group that is included in the exposure assessment calculation. Additionally, or alternatively, the customer influence score may be a modifier of a calculated exposure assessment. For example, the customer influence score may be used to increase calculated exposure assessments for a specific environment or entity by up to ten percent. In some embodiments, a customer influence score may influence weights for factors or factor groups of an exposure assessment. For example, a customer influence score may indicate a specific weight to be assigned to a certain factor or factor group, set a maximum or minimum weight for a certain factor or factor group, or indicate that a weight for a certain factor or factor group should be altered by a certain amount or percentage.

Figure 9:
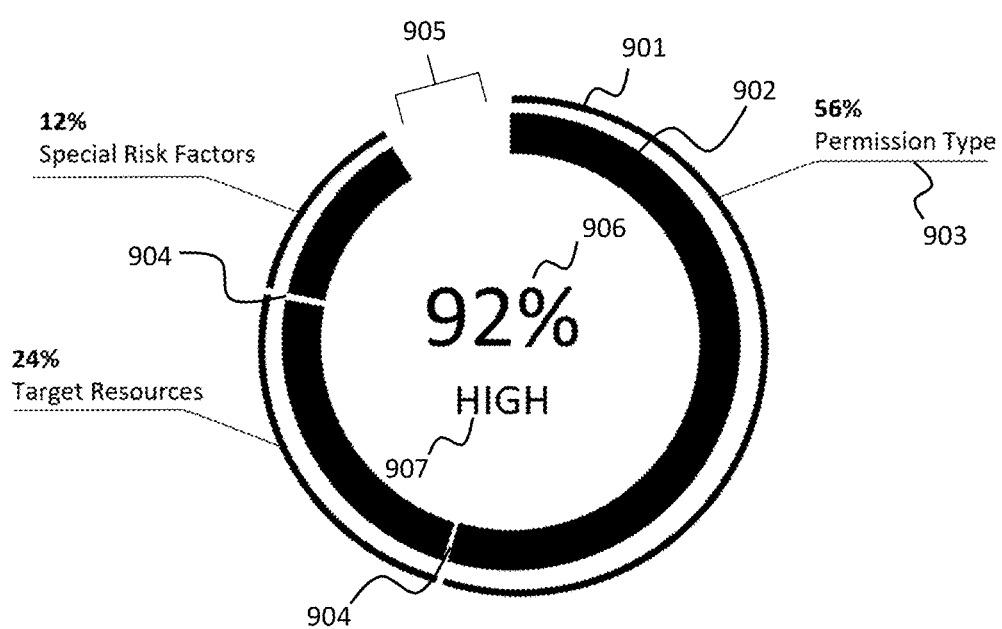
FIG. 9 is an illustration depicting an exemplary visual representation of an exposure assessment, in accordance with disclosed embodiments.

FIG. 9 is an illustration depicting an exemplary visual representation 900 of an exposure assessment, in accordance with disclosed embodiments. Visual representation 900 may be used to represent the components of an exposure assessment, the influence each component has on the overall assessment, and indication of the relative exposure level of the entity. Visual representation 900 may include a series of partial rings, including outer ring 901 and inner ring 902. The rings may form a circle or partial circle starting at the top middle (i.e. 12 o'clock position) and continuing clockwise around the circle. The distance that a ring runs around the circle may indicate the percentage score of a corresponding factor group. For example, a score of 25% would occupy one fourth of the circle, while a 50% score would occupy half of a circle (e.g., from the 12 o'clock position to the 6 o'clock position). Visual representation 900 does not show a full circle, which may indicate that the corresponding entity's exposure score is less than 100%. This may be indicated by gap 905 in the circle. While visual representation 900 starts at the top (12'clock position) and continues clockwise around the circle, with the factor groups being disposed around the circle in a descending order, other formats are possible. For example, the starting position may vary, the order of the factor groups may vary, the starting position and order may be the same but the sequence may proceed counterclockwise around the circle, etc.

Each pair of outer ring 901 and inner ring 902 may correspond to a factor group that makes up part of the exposure assessment score. Each outer ring and inner ring of the visual representation may be differentiated by separations 904. While visual representation 900 shows an inner ring 901 and outer ring 902, some visual representations may not include more or fewer rings. For example, a visual representation may include inner ring 902 for each factor group, but not include outer ring 901.

While separations 904 are used to differentiate factor group rings in visual representation 900, other differentiating indications may be used. For example, factor group rings may have different colors, shades, brightness, patterns, line styles, or other visual cues used to indicate separate rings within the visual representation.

Visual representation 900 may include one or more callouts 903. Callout 903 may indicate the factor group corresponding to rings 901, 902. The callout may also indicate the factor group's numerical score. In some embodiments, the numerical score or factor group name may be placed within the ring, instead of in a separate callout. For example, the percentage and factor group of callout 903 could be shown as text within inner ring 902. In other cases, a combination of callouts and text placement within the rings could be used.

In some embodiments, visual representation 900 may include a callout or other indication (not pictured) showing factor groups that exist for the entity but were not factored into the exposure assessment. As described herein, an exposure assessment may exclude one or more irrelevant factor groups. For example, visual representation 900 may include a callout from gap 905 that indicates any factors or factors groups not included in the exposure assessment calculation. Although visual representation 900 is depicted as corresponding to factor groups, in some embodiments, visual representation 900 may also indicate individual security factors.

Visual representation 900 may include exposure assessment 906 of the corresponding entity. Exposure assessment 906 is depicted in visual representation 900 as a percentage, but, as described herein, the exposure assessment may take other forms, such as a numerical score of 50, etc. In such cases, the lengths of rings 901, 902 may still indicate the percentage influence of a factor group on the exposure assessment. For example, if the exposure assessment is out of a scale of 0 to 50, a factor group having a score of 25 may have corresponding rings that form a half-circle.

Visual representation 900 may include an indication 907 of the relative exposure level of the entity. The relative exposure level may indicate the security exposure of the corresponding entity with respect to other entities in the same system or environment. The relative exposure level may also indicate the exposure with reference to other similar entities in different systems or environments. For example, indication 906 may be part of a scale indicating a relative exposure level (e.g., HIGH, MEDIUM, LOW). In some embodiments, in addition to or in place of a word indicator, indication 906 may include a symbol, shape, or color indicating the relative exposure level, or a combination thereof.

While visual representation 900 is depicted as a two-dimensional circle or ring, visual representations may take other forms, for example, a bar or rectangle, a pie chart, area chart, line chart, a spherical chart, or other two-dimensional or three-dimensional visualization.

In some embodiments, comparisons between visual representations of different entities may indicate relative exposure levels between the entities. For example, visual representation 900 may vary in color, shade, brightness, patterns, etc. indicating a relative exposure level. A visual representation for an entity with a high exposure level (e.g., 95%) may have a darker color than an entity with a lower exposure level (e.g., 10%). Such a difference may be seen by comparing visual representation 750 of FIG. 7 (lower relative exposure) with visual representation 850 of FIG. 8 (higher relative exposure). As another example, a visual representation for an entity with a high exposure level (e.g., 95%) may have a different color altogether (e.g., red) from that of an entity with a lower exposure level (e.g., 10% and green).

While not depicted in FIG. 9, visual representation 900 may include an indication of a composite exposure assessment score threshold. Various exposure assessment thresholds are possible and are described in greater detail below with respect to FIG. 10. As an example, visual representation 900 may include an additional line or other indicator part way around the circle, indicating where a certain threshold is located (e.g., a line may be placed on the circle at the 9 o'clock position, indicating a threshold score of 75%).

Figure 10:
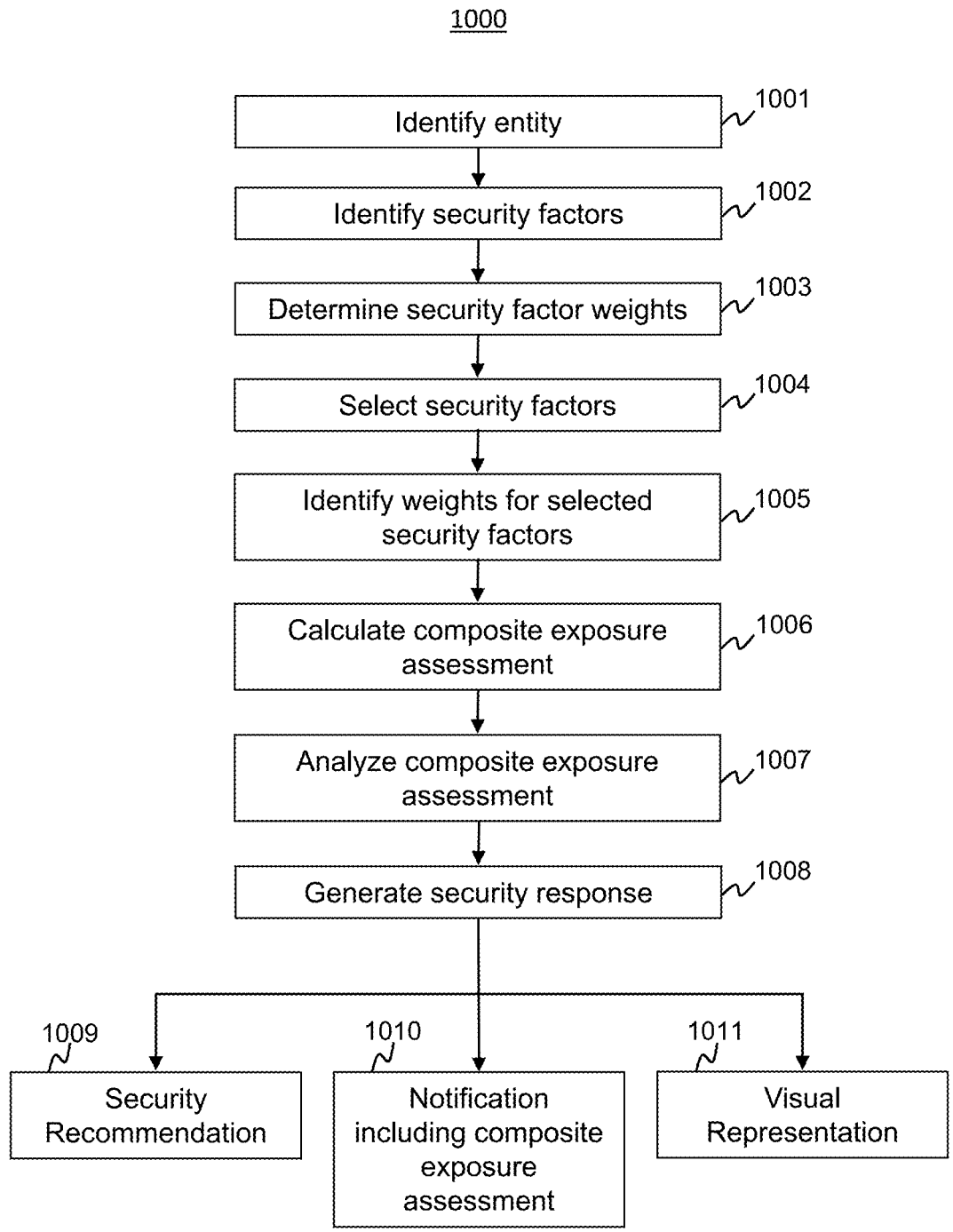
FIG. 10 is a flowchart depicting an exemplary process for dynamically performing entity-specific exposure assessments, in accordance with disclosed embodiments.

FIG. 10 is a flowchart depicting an exemplary process 1000 for dynamically performing entity-specific exposure assessments, in accordance with disclosed embodiments. Process 1000 may be executed by, for example, security server 105 as shown in FIG. 1. Process 1000 may correspond to parts of FIGS. 6-9, and accordingly, descriptions of the components and processes therein may apply to process 1000 as well. At step 1001, process 1000 may include identifying an entity. The entity may be a human user, account, device, code instance, virtual instance, or the like. In some embodiments, the entity may be associated with client device 101. The entity may be assigned or associated with one or more permissions that may permit the entity to access or perform actions upon a system, environment, secure resource, etc.

At step 1002, process 1000 may include identifying security factors. The security factors may be associated with the entity or may be generically associated with a system or network environment. As described above, security factors may include, for example, sub-scores 201 of FIG. 2. Security factors may also include other considerations related to the entity, such as the total number of permissions, number of used permissions, security controls of the entity, etc.

Identifying security factors may include accessing or receiving the security factors. For example, the security factors may be stored on another device or in a storage location within network 100. Security factors may also be stored locally on security server 105. In other embodiments, security factors may be stored in database 106. Accordingly, identifying security factors may include querying database 106 and retrieving the security factors.

Identifying security factors may include determining the security factors. Security factors may be determined by calculating the scores for the security factors. The security factors may be determined as described above with respect to sub-scores 201. For a certain security factor type, a score may be calculated for each permission associated with entity. Then, these scores may be aggregated or average into a single security factor score the entity that accounts for each of the entity's associated permissions or used permissions.

Identifying security factors may also include identifying security factor groups. As described herein, security factor groups may include one or more security factors. Security factor group scores may be calculated by determining a weighted average of the scores of the security factors within the group.

In some embodiments, factor groups for the entity may be predetermined. Predetermined groups may then be retrieved at step 1002 as described above with respect to retrieving security factors. Additionally, or alternatively, step 1002 may include determining one or more factor groups from identified security factors. Factor groups may be determined based on similarities between security factors. Similar security factors or factors similarly influencing the security exposure of the entity may be grouped together. In some embodiments, groups may be determined by a machine learning algorithm. For example, a clustering algorithm may be implemented to form clusters of similar security factors. Security factors in the same cluster identified by the machine learning algorithm may be placed into a factor group.

In some embodiments, the machine learning algorithm may be dynamically updated over time. For example, the machine learning algorithm may be updated based on feedback from the security server. As an example, the security server may monitor entities over time and update a machine learning model for generating factor groups based on feedback from the monitoring. Over time, the machine learning algorithm may determine that certain factors cause similar effects on entity's security, thus making it beneficial for those factors to be in the same group. Accordingly, the algorithm may be trained dynamically and over time to adjust the criteria used to generate factor groups.

At step 1003, process 100 may include determining security factor weights. Security factor weights may indicate the relative importance of each of the security factors associated with an entity. Some security factors may more strongly indicate a potential security risk than other security factors. For example, the type of target resource may better represent the potential system risk of the entity than a permission's category.

Weights may be entity-specific. Accordingly, weights for one entity may be different from the weights of a second entity within the same system or environment. If weights are predetermined and stored, the weights may be stored with reference to a specific entity and security factor.

In some embodiments, weights may be dynamically generated for the entity. For example, weights may be generated based on various characteristics of the entity, such as the type of the entity or the environment or system of which the entity is a part. In some embodiments, weights may be determined according to predefined preferences by the system administrator taking into consideration the importance of each security factor. In some cases, weights for certain scores may be dynamically generated, while others are static. Accordingly, each relevant dynamic factor weight may impact the weight of the other factors out of the total score. The total of all static factor weights may define the share of the dynamic factors out of the total score.

Weights may be generated using a machine learning or artificial intelligence method, such as a logistic regression model, naïve Bayes classifier, decision tree, random forest model, neural network, or other model. According to disclosed embodiments, the machine learning algorithm may be manually trained. For example, the machine learning algorithm may be trained using an input dataset of cookies with preidentified criteria and a predetermined indication of whether the cookie should be encrypted.

In some embodiments, the machine learning algorithm may be dynamically updated over time. For example, the machine learning algorithm may be updated based on feedback from the security server. As an example, the security server may monitor entities over time and update a machine learning model for generating weights based on feedback from the monitoring. Over time, the machine learning algorithm may determine that certain factors or factor groups are more likely or less likely to cause an entity to present a security threat. Accordingly, the algorithm may be trained dynamically and over time to adjust the criteria used to generate and assign weights.

If factor groups were identified at step 1002, step 1003 may include identifying factor group weights. Identifying factor group weighs may occur substantially as described with respect to the security factor weights.

At step 1004, process 1000 may include selecting one or more security factors or factor groups of the identified security factors or factor groups. As described above, exposure assessments may be calculated using a subset of identified security factors or factor groups. Some security factors or factor groups may be more relevant for some entities than others.

Such factors may be, for example, binary factors such as the shadow admin sub-score, indicating that the entity either is or is not a shadow admin. An entity that is not a shadow admin will not include the "shadow admin" factor, i.e., the weight of the shadow admin factor will be zero, oppposingly to a case in which the weight is not zero, but the sub-score of the factor is zero.

Similarly, another exemplary binary factor may be an anomaly detection score. If an access anomaly related to an entity is detected, the anomaly score may be one. If an no access anomalies related to the entity are detected, the anomaly score may be zero.

Accordingly, some factors or factor groups may be preferably excluded from an entity's exposure assessment to provide a more accurate exposure assessment for the entity. For example, binary scores of zero may be excluded.

Security factors or factor groups may be selected by use of a machine learning algorithm. For example, a machine learning algorithm may be trained to recognize, based on certain entity characteristics, which factors or groups are most relevant or not relevant to an entity. The machine learning algorithm may be trained, for example, using a training data set comprising manually identified entities, entity characteristics, and/or relevant factors or factor groups. In some embodiments, the machine learning algorithm may be dynamically updated over time. For example, over time, the machine learning algorithm may determine that certain factors or factor groups are very unlikely to cause an entity to present a security threat. Accordingly, the algorithm may be trained to not select these factors because they may not be relevant to the entity.

In some embodiments, the selecting of security factors or factor groups may be based on an entity classification. For example, entities of certain classifications may be selected, while other classifications may not be selected. Entities may be classified based on a variety factors, including the type of entity, number of associated permissions, number of used permissions, associated environments or resources, implemented security measures, or other entity characteristics. Entities may be assigned classification using a machine learning algorithm, for example a classification algorithm such as a naïve Bayes classifier, decision tree, random forest model, K-nearest neighbors, gradient boosting algorithm, neural network, or other model. In some embodiments, entities may be manually classified, for example, by a network administrator.

At step 1005, process 1000 may include identifying the weights corresponding to the factors selected at step 1004. If step 1004 included selecting factor groups, step 1005 may include identifying factor group weights. Identifying the weights may include retrieving the weights from local storage, or from another device or storage location within the network.

At step 1006, process 1000 may include calculating an exposure assessment for the identified entity. The exposure assessment may be based on the selected factors and their corresponding identified weights. Using the selected factors and corresponding weights, the exposure assessment may be determined by calculating the weighted average of the selected factor scores, as described above. If step 1004 included selecting security factor groups, calculating the exposure assessment for the identity may be based on the selected security factor groups. For example, rather than calculating the weighted average of selected factors, calculating the exposure assessment may include calculating the weighted average of the selected factor groups. In some embodiments, the exposure assessment may also be based one or more customer influence scores. The customer influence score may be stored on security server 105, or may be retrieved from another device or storage location, for example, from database 106 or client device 101. For example, is process 1000 is executed by security server 105 associated with a security service, the security service may receive one or more customer influence scores from the customer as part of an onboarding or registration process. The customer influence scores may be specific to certain entities, systems, or environments. The customer influence score may influence the calculation of the exposure assessment, as described above.

At step 1007, process 1000 may include analyzing the composite exposure assessment. Analyzing the exposure assessment may include comparing the exposure assessment to a reference score or score threshold. For example, security server 105 may identify or store a reference score. The reference score may be specific to a type of entity, a certain network or system, a type of network or system, etc. In other embodiments, the reference score might be a generic reference score used for all entities. In some embodiments, if the comparison indicates that the exposure assessment exceeds the reference score, security server 105 may determine that the entity presents a high risk or a security threat and may take action to lower the score or otherwise address the security threat. For example, if the calculated exposure assessment score exceeds the reference score, process 1000 may include proceeding to step 1008 and generating a security response. If the calculated exposure assessment does not exceed the reference score, security server 105 may determine that the entity is not a security threat and may take no action.

Additionally, or alternatively, analyzing the exposure assessment may including comparing the exposure assessment to one or more threshold scores. A variety of different threshold scores are possible. For example, threshold scores may be used to indicate a relative level of the exposure assessment (e.g., high, medium, low as described above). If an exposure assessment score falls below a first threshold (e.g., 35%), the entity may be classified as a "low" or "low-risk" entity. If the exposure assessment score exceeds a second threshold (e.g., 75%), the entity may be classified as a "high" or "high-risk" entity. If the exposure assessment score falls between the two thresholds (e.g., 35% to 75%), the entity may be classified as a "medium" or "medium-risk" entity. As discussed in greater detail below, threshold scores may also be used to determine whether security responses will be enacted automatically or whether they will be recommendations that will not be enacted until they are approved or other further action is taken. Threshold scores may also be used to determine what particular actions will be taken.

At step 1008, process 1000 may include generating a security response. The security response may be based on the analysis conducted at step 1007. For example, a threshold score or reference score may be used to influence the type of response or action that is taken. For example, if the comparison of step 1007 indicates that the calculated exposure assessment does not exceed the reference score, security server 105 may determine that the entity is not a security threat and may take no action. In other cases, when the comparison indicates that the calculated exposure assessment does not exceed the reference score, generating a security response may include merely generating a notification 1010, as described in greater detail below. Conversely, if the comparison indicates that the exposure assessment exceeds the reference score, generating a security response may include additional measures to designed to lower the assessment score or otherwise address an existing or potential security threat.

Generating a security response may include generating a notification 1010. Notification 1010 may include the composite exposure assessment calculated at step 1006. Notification 1010 may also include at least a portion of the analysis conducted at 1007. For example, the notification 1010 may indicate that the exposure assessment exceeds a threshold score value.

Generating a security response may include generation of a visual representation 1011 of the exposure assessment. Visual representation 1011 may take a variety of forms, for example, a visual representation as described above with reference to FIG. 9.

Generating a security response may include generating a security recommendation 1009. A security recommendation may be a recommendation to reduce a scope of privileges of the entity, for example by reducing the number of privileges, revoking specific privileges, revoking all privileges, revoking access to certain secure resources, etc. Additionally or alternatively, a security recommendation may include other recommended security measures, such as changing an authentication process associated with the entity (e.g., implementing multi-factor authentication, requiring more frequent credential rotation, etc.) or other actions to increase the security of the system with respect to the identified entity.

In some embodiments, the security recommendation may be based on one or more of the selected security factors. For example, security server 105 may inspect the selected security factors or factor groups. If one factor group's score is significantly higher than others, security server 105 may recognize this group as being the source of the potential security risk. For example, if a security factor indicates that the entity has a large number of unused permissions, the security recommendation may include revoking one or more those unused permissions.

In some embodiments, security recommendation 1009 may transmitted to another device for approval by, for example, an administrator. The administrator may accept the recommendation to institute the recommend changes or security measures. Accordingly, step 1009 may include receiving an indication of acceptance of the security recommendation.

In some embodiments, security recommendations may be automatically enacted. As discussed above, threshold scores may be used to determine whether security responses will be enacted automatically or whether they will be recommendations that will not be enacted until they are approved, or other further action is taken. For example, if an exposure assessment exceeds a certain threshold, security server 105 may be configured to automatically audit the privilege usage of the entity or suspend the entity's privileges for a certain period of time. Similarly, if the exposure assessment falls below a certain threshold, security server 105 may be configured to take no action or recommend (but not automatically implement) certain actions. Threshold scores may also be used to determine what particular actions will be taken or recommended. For example, threshold scores may be used to determine if a privilege use audit or a change in a scope of privileges should implemented or recommended. If the composite exposure assessment does not exceed a score threshold, the security recommendation may include maintaining the scope of the entity's privileges. Conversely, if the exposure assessment exceeds that score threshold, the recommendation may include reducing or otherwise altering the scope of the entity's privileges.

In some embodiments, when an indication of acceptance of security recommendations is received, step 1008 may also include implementing the security recommendations, for example, changing a scope of privileges associated with the entity. After a change is implemented (whether automatically or upon acceptance of a recommendation), process 1000 may include updating the exposure assessment score. Updating the exposure assessment may include repeating one or more of steps 1002 through 1008. For example, if a security change is implemented to alter the scope of privileges of the entity, the scores of one or more security factors may change, which may ultimately change the resulting exposure assessment. Accordingly, a new exposure assessment may be calculated, and new security responses may be generated based on the exposure assessment score. Process 1000 may also include comparing the previous exposure assessment to the new updated exposure assessment. Accordingly, the security response for the new updated exposure score may include an indication of the differences between the previous exposure assessment and the new updated exposure assessment.

A potential use case of the disclosed embodiments is described below. It is understood that this exemplary use case is provided by way of example only and is not limiting of the present disclosure.

One potential implementation may be to address the least-privilege security problem of a database containing highly sensitive information. A user may use a computing device (e.g., a laptop computer) to access the database hosted in a cloud computing network. The computing device, database, and cloud computing network may also be in communication with a security server that manages secure access to the database. Using the laptop computer, the user may request access to the database. In response, the security server may request that the user be authenticated using some type of identifier, such as a user account and password or biometric authentication. If user's credentials are valid, the security server may authorize access to the user. The user's account may have a number of different permissions associated with it. For example, the user may be able to read the information contained on the database. Users with administrative accounts may have more permissions, such as the ability to delete information from the database, or create new authorized users.

In order to increase security and limit its potential attack surface, the system may run a least-privilege damage check on the system, calculate one or more least-privilege damage scores, and act accordingly based upon the resulting scores. This may occur automatically before the identity is permitted to access the database, periodically, or otherwise. The system may identify all of the relevant permissions associated with the identity. The system may then choose a specific permission and identify if it is used by the corresponding user's identity. If unused, the system may then identify a number of attributes for that permission, for example, the type of permission, the permission's self-frequency, and the permission's general frequency. The system may then calculate a least-privilege damage score based upon the permission's type attributes. For example, if the unused permission selected is a "delete" permission, the identity has never used a delete or similar permission, and delete permissions are rarely used by any other identities associated with the database, the permission type score may be relatively high, indicating that the permission is high risk.

The system may also identify attributes of the database (the target resource) and calculate a score based on those attributes. For example, the system may identify that the resource is for data storage, is specifically a database, and contains sensitive information. The system may also identify that the resource is relatively small because the identity credentials relate to only a single database. Accordingly, the system may create a weighted score related to the target resource.

The system may further create a third least-privilege damage score relating to other special risk factors, such as the risk of shadow admins, the specific permission's frequency in attacks, whether the target resource is identified as especially sensitive, and the security status of the resource. This score may be particularly high for the database in this example because it could be identified as an especially sensitive resource because it contains sensitive or secret information.

The system may then calculate the permission's overall least-privilege damage score by combing the permission's type score, the target resources score, and the special risk factors score. The system may repeat this process for each of the unused permissions associated with the identity. Then the system may compare the scores of each permission and identify the most at risk unused permission. The system may then address the problem by revoking the highest risk permission first. In this example, an unused delete permission associated with the user's identity may be revoked if the user has never used it because the delete permission may present a high risk to the system if access is obtained by a malicious user that wishes to destroy important data stored on the database.

In scenarios where there are multiple secure resources, such as multiple identities, the system may create an aggregate entity least-privilege damage score for each identity. The entity least-privilege damage score may be calculated by aggregating the scores of the permissions associated with the particular entity (e.g., each identity). Comparing the entity least-privilege damage scores for each identity may permit the system to determine which identity is the highest risk, and thus should be addressed first. After determining the highest risk identity, the system may then compare the scores for the permissions associated with the identity to determine which permissions of the identity should be addressed first.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for dynamically performing entity-specific security assessments for entities of virtualized network environments, the operations comprising:
   identifying an entity associated with a plurality of permissions in a virtualized network environment;
   determining scores of a plurality of security factors;
   determining entity-specific weights to the plurality of security factors;
   generating a composite exposure assessment for the entity across the plurality of permissions, the generating comprising:
      selecting at least two security factors of the plurality of security factors;
      identifying the weights corresponding to the selected security factors; and
      calculating the composite exposure assessment using the selected security factors and corresponding weights;
   determining a score of a special security factor associated with the entity;
   modifying the calculated composite exposure assessment based on the determined score of the special security factor;
   analyzing the modified composite exposure assessment; and
   generating at least one of:
      a security recommendation based on the analysis to alter a scope of privileges of the entity;
      a notification providing an indication of one or more unused permissions of the plurality of permissions; or
      a visual representation of the modified composite exposure assessment of the entity.

2. The non-transitory computer readable medium of claim 1, wherein the plurality of security factors include at least one of:
   a permission type of each of the plurality of permissions; or
   a usage status of a permission of each of the plurality of permissions.

3. The non-transitory computer readable medium of claim 1, wherein the calculated composite exposure assessment is further modified based on a customer influence score.

4. The non-transitory computer readable medium of claim 1, wherein the visual representation comprises a representation of one or more of the plurality of security factors associated with the modified composite exposure assessment.

5. The non-transitory computer readable medium of claim 4, wherein the visual representation indicates an effect of the one or more of the plurality of security factors on the calculation of the modified composite exposure assessment.

6. The non-transitory computer readable medium of claim 4, wherein the visual representation indicates a composite exposure assessment score threshold.

7. The non-transitory computer readable medium of claim 1, wherein selecting the at least two security factors of the plurality of security factors is performed using a machine learning algorithm.

8. The non-transitory computer readable medium of claim 1, wherein selecting the at least two security factors of the plurality of security factors is based on an entity classification.

9. The non-transitory computer readable medium of claim 8, wherein the entity classification is generated using a machine learning algorithm.

10. The non-transitory computer readable medium of claim 8, wherein the entity classification is manually generated.

11. A computer-implemented method for dynamically performing entity-specific security assessments for entities of virtualized network environments, the method comprising:
   identifying an entity associated with a plurality of permissions in a virtualized network environment;
   determining scores of a plurality of security factors;
   determining entity-specific weights to the plurality of security factors;
   generating a composite exposure assessment for the entity across the plurality of permissions, the generating comprising:
      selecting at least two security factors of the plurality of security factors;
      identifying the weights corresponding to the selected security factors; and
      calculating the composite exposure assessment using the selected security factors and corresponding weights;
   determining a score of a special security factor associated with the entity;
   modifying the calculated composite exposure assessment based on the determined score of the special security factor;
   analyzing the modified composite exposure assessment; and
   generating at least one of:
      a security recommendation to revoke one or more unused permissions of the plurality of permissions;
      a notification providing an indication of the composite exposure assessment; or
      a visual representation of the composite exposure assessment.

12. The computer-implemented method of claim 11, wherein the security recommendation is based on one or more of the selected security factors.

13. The computer-implemented method of claim 11, further comprising: receiving an indication of acceptance of the security recommendation.

14. The computer-implemented method of claim 13, further comprising: updating, based on the acceptance of the security recommendation, the modified composite exposure assessment.

15. The computer-implemented method of claim 11, wherein analyzing the composite exposure assessment comprises comparing the modified composite exposure assessment with a reference score.

16. The computer-implemented method of claim 11, wherein: analyzing the modified composite exposure assessment comprises determining that the modified composite exposure assessment does not exceed a score threshold; and the security recommendation comprises a recommendation to maintain a scope of privileges of the entity.

17. The computer-implemented method of claim 11, wherein: analyzing the modified composite exposure assessment comprises determining that the modified composite exposure assessment exceeds a score threshold; and the security recommendation comprises a recommendation to reduce a scope of privileges of the entity.

18. The computer-implemented method of claim 17, further comprising:
receiving an indication of acceptance of the security recommendation;
updating, based on the acceptance of the security recommendation, the modified composite exposure assessment;
analyzing the updated composite exposure assessment; and
determining that the updated composite exposure assessment does not exceed a score threshold.

19. The computer-implemented method of claim 11, wherein the security recommendation comprises a recommendation to audit privilege usage of the entity.

20. The computer-implemented method of claim 11, further comprising: generating, based on the security recommendation, a second modified composite exposure assessment for the entity, the second modified composite exposure assessment indicating the change in the first composite exposure assessment when the security recommendation is accepted.

21. The computer-implemented method of claim 11, further comprising: aggregating scores for multiple entities to generate a composite exposure assessment for the virtualized network environment.

* * * * *